(12) United States Patent
Gilliland et al.

(10) Patent No.: US 9,799,057 B2
(45) Date of Patent: Oct. 24, 2017

(54) SYSTEMS AND METHODS FOR CREATING AND MANAGING MARKETING APPLICATIONS, EVENTS, PROMOTIONS, AND PUBLICATIONS

(71) Applicants: Christine Gilliland, St. Charles, IL (US); Veda Christina Burke, South Elgin, IL (US); David Klawikowski, Gilberts, IL (US); Michael Cumberland, Chicago, IL (US); Asim Abbas Khatkhatay, Hoffman Estates, IL (US); Aby Varghese, Hoffman Estates, IL (US); Ranajit Bhattacharjee, Hoffman Estates, IL (US); Vipin Das R, Hoffman Estates, IL (US)

(72) Inventors: Christine Gilliland, St. Charles, IL (US); Veda Christina Burke, South Elgin, IL (US); David Klawikowski, Gilberts, IL (US); Michael Cumberland, Chicago, IL (US); Asim Abbas Khatkhatay, Hoffman Estates, IL (US); Aby Varghese, Hoffman Estates, IL (US); Ranajit Bhattacharjee, Hoffman Estates, IL (US); Vipin Das R, Hoffman Estates, IL (US)

(73) Assignee: SEARS BRANDS, L.L.C., Hoffman Estates, IL (US)

(*) Notice: Subject to any disclaimer, the term of this patent is extended or adjusted under 35 U.S.C. 154(b) by 107 days.

(21) Appl. No.: 13/757,485

(22) Filed: Feb. 1, 2013

(65) Prior Publication Data

US 2013/0204714 A1 Aug. 8, 2013

Related U.S. Application Data

(60) Provisional application No. 61/594,777, filed on Feb. 3, 2012.

(51) Int. Cl.
*G06Q 30/02* (2012.01)

(52) U.S. Cl.
CPC .................. *G06Q 30/0276* (2013.01)

(58) Field of Classification Search
CPC ................................. G06Q 30/0276
(Continued)

(56) References Cited

U.S. PATENT DOCUMENTS

| 2005/0144075 | A1 | 6/2005 | Magowan et al. |
| 2005/0289461 | A1* | 12/2005 | Amado .................. G06Q 30/02 715/255 |

(Continued)

OTHER PUBLICATIONS

PCT, International Search Report and the Written Opinion of the International Searching Authority, or the Declaration, in International application No. PCT/US13/24326, dated Apr. 29, 2013. (13 pages).

(Continued)

*Primary Examiner* — David Stoltenberg
*Assistant Examiner* — Allan Woodworth, II
(74) *Attorney, Agent, or Firm* — McAndrews, Held & Malloy, Ltd.

(57) ABSTRACT

Certain embodiments provide systems and methods for creation and management of marketing applications, events, promotions and publications. The system includes a user input device configured to provide a user input for one or more applications. The system includes a display configured to display information from the one or more applications. The system includes a processing unit communicatively coupled to the user input device and the display. The processing unit is configured to execute one or more application to create the promotional activity, configure the promotional activity, and associate an offer with the configured promotional activity.

17 Claims, 13 Drawing Sheets

(58) Field of Classification Search
USPC .................................................. 705/14.72
See application file for complete search history.

(56) References Cited

U.S. PATENT DOCUMENTS

| | | |
|---|---|---|
| 2006/0277118 A1 | 12/2006 | Keohane et al. |
| 2007/0143181 A1* | 6/2007 | Linkner et al. ................. 705/14 |
| 2008/0183577 A1* | 7/2008 | Evans .................... G06Q 30/02 705/14.69 |
| 2008/0189156 A1* | 8/2008 | Voda .................... G06Q 10/063 705/7.33 |
| 2010/0100438 A1* | 4/2010 | Proto et al. ................. 705/14.52 |
| 2010/0229085 A1* | 9/2010 | Nelson .................... G06Q 10/06 715/255 |
| 2011/0302039 A1 | 12/2011 | Fordyce, III et al. |

OTHER PUBLICATIONS

PCT, Notification Concerning Transmittal of International Preliminary Report on Patentability, in application No. PCT/US2013/024326 dated Jul. 21, 2015 (6 pages).
Supplemental European Search Report, Application No. EP13744232.3, dated May 25, 2016, 5 pages.

* cited by examiner

FIG. 11

SYSTEMS AND METHODS FOR CREATING AND MANAGING MARKETING APPLICATIONS, EVENTS, PROMOTIONS, AND PUBLICATIONS

CROSS-REFERENCE TO RELATED APPLICATIONS/INCORPORATION BY REFERENCE

The present application claims priority under 35 U.S.C. §119(e) to provisional application Ser. No. 61/594,777, filed on Feb. 3, 2012.

The above referenced provisional application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to systems and methods for creation and management of marketing applications, events, promotions and publications.

BACKGROUND OF THE INVENTION

In currently known systems, marketing applications, events, promotions, and publications are created and edited manually using software applications such as Microsoft Excel. Moreover, existing offer-creation and offer-management software solutions do not support an adequate number of offer types, nor do they offer a high degree of variability and customizability.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that creates a promotional activity, configures the promotional activity, and associates an offer with the configured promotional activity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 11 is a screen shot of an offer management window displayed in an offer manager application, in accordance with a representative embodiment of the present invention.

DETAILED DESCRIPTION OF THE INVENTION

Figure 1:
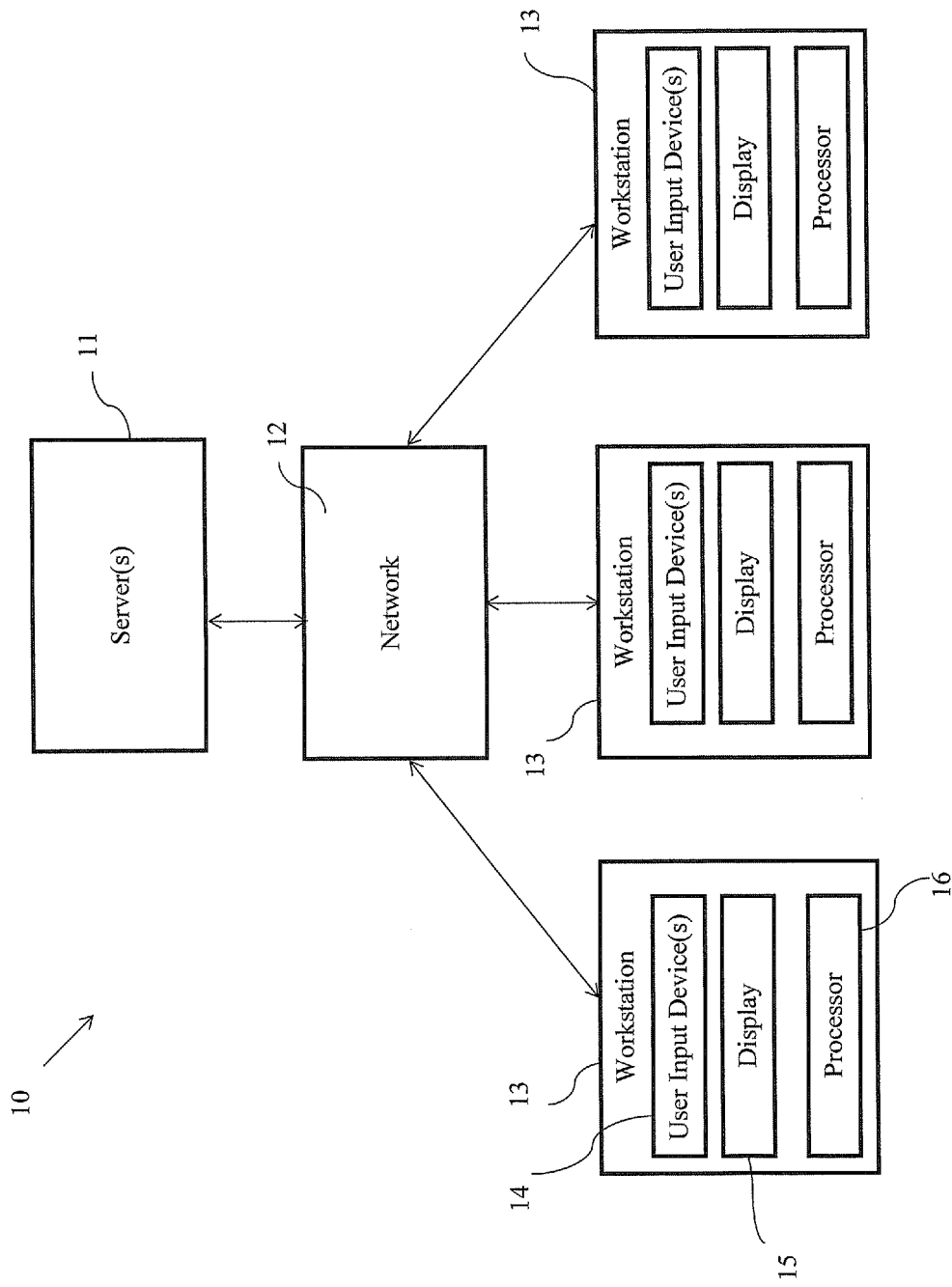
FIG. 1 is a block diagram of an exemplary system in which a representative embodiment of the present invention may be practiced.

Aspects of the present invention are related to systems and methods for creation and management of marketing applications, events, promotions and publications. More specifically, certain embodiments of the present invention relate to systems and methods that create a promotional activity, configure the promotional activity, and associate an offer with the configured promotional activity.

A representative embodiment of the present invention aids in the automation and/or streamlining of the creation and management of marketing application, events, promotions and/or publications.

Various embodiments provide a system 10 configured to create and manage a promotional activity. In a representative embodiment, the system 10 comprises a user input device 14 configured to provide a user input for at least one application, a display 15 configured to display information from the at least one application, and a processing unit 16 communicatively coupled to the user input device 14 and the display 15. The processing unit 16 is configured to execute one or more application to create the promotional activity, configure the promotional activity, and associate an offer with the configured promotional activity.

Certain embodiments provide a method 100 for creating and managing a promotional activity. The method 100 is performed by one or more processing units 16 executing one or more applications. The method 100 comprises creating the promotional activity 110, configuring the promotional activity 120, and associating an offer with the configured promotional activity 130.

As utilized herein, the terms "exemplary" or "example" means serving as a non-limiting example, instance, or illustration. As utilized herein, the term "e.g." introduces a list of one or more non-limiting examples, instances, or illustrations.

FIG. 1 is a block diagram of an exemplary system 10 in which a representative embodiment of the present invention may be practiced. As illustrated in FIG. 1, the system 10 includes one or more servers 11. The server(s) 11 may include, for example, web server(s), database server(s), application server(s), and the like. The server(s) 11 may be interconnected, and may singly or as a group be connected to a network 12, such as the Internet, for example, via any suitable combination of wired or wireless data communication links. FIG. 1 also includes one or more workstations 13, which are connected to the network 12 by any suitable combination of wired or wireless data communication links. Workstation(s) 13 may be any of, for example, a desktop computer, a laptop computer, a notebook computer, a netbook computer, a tablet computer, or any other electronic device having capabilities suitable for accessing the network 12.

In various embodiments, the workstation(s) 13 includes user input device(s) 14, a display 15, and a processor 16, among other things. Components of the workstation(s) 13 may be implemented in software, hardware, firmware, and/or the like. The various components of the workstation(s) 13 may be communicatively linked. Components of the workstation(s) 13 may be implemented separately and/or integrated in various forms. For example, the display 15 and the user input device(s) 14 may be integrated as a touchscreen display The user input device(s) 14 may include any device(s) capable of communicating information from a user and/or at the direction of the user to the processor 16 of the workstation 13, for example. The user input device(s) 14 may include button(s), a touchscreen, motion tracking, voice recognition, a mousing device, keyboard, and/or any other device capable of receiving a user directive. In certain embodiments, one or more of the user input devices 14 may be integrated into other components, such as the display 15, for example. As an example, user input device 14 may include a touchscreen display.

The display 15 may be any device capable of communicating visual information to a user. For example, a display 15 may include a liquid crystal diode display, a light emitting diode display, and/or any suitable display. The display 15 can be operable to display information from one or more promotional activity creation and management applications, or any suitable information. In various embodiments, the display 15 may display information provided by the processor 16, for example.

The processor 16 may be one or more central processing units, microprocessors, microcontrollers, and/or the like. The processor 16 may be an integrated component, or may be distributed across various locations, for example. The processor 16 may be capable of executing software applications, receiving input information from user input device (s) 14, and generating an output displayable by a display 15, among other things. The processor 16 may be capable of executing any of the method(s) and/or set(s) of instructions discussed below in accordance with the present invention, for example. In certain embodiments, the processor 16 may execute one or more promotional activity creation and management applications available at server(s) 11 and/or stored at the workstation 13 in response to user inputs received from user input device(s) 14, for example.

In various embodiments, the information provided by the user input device(s) 14 to the processor 16 may be processed by the processor 16 to control one or more applications for creating and managing promotional activities, for example. As an example, button depressions, touchscreen selections, mousing inputs, keyboard inputs, and/or voice commands, among other things, may be received from the user input device(s) 14 and processed by the processor 16 to create a promotional activity, configure the promotional activity, and associate offers with the configured promotional activity, for example.

Figure 2:
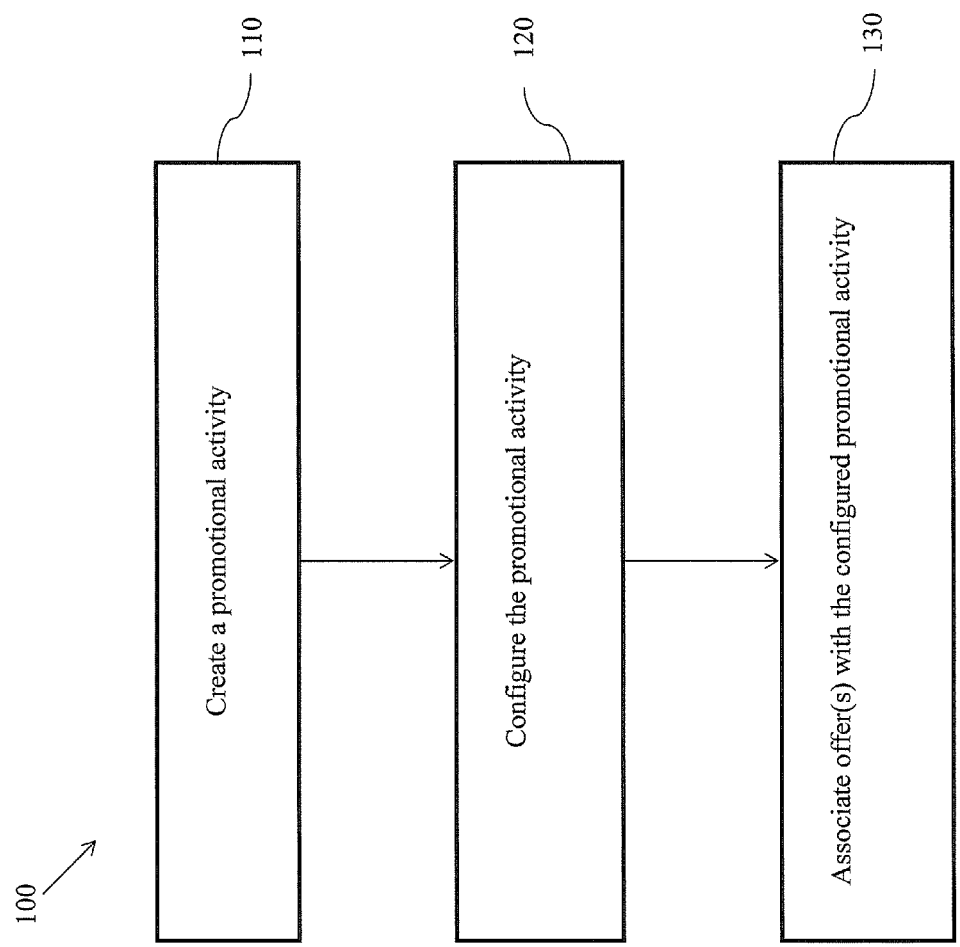
FIG. 2 is a flowchart illustrating an exemplary method for creating and managing a promotional activity, in accordance with a representative embodiment of the present invention.

FIG. 2 is a flowchart illustrating an exemplary method for creating and managing a promotional activity, in accordance with a representative embodiment of the present invention. The actions of the method of FIG. 2 may be performed using elements of the system 10 of FIG. 1 including, for example, the server(s) 11, network 12, and the workstation(s) 13 comprising user input devices(s) 14, display 15, and processor 16.

The method of FIG. 2 begins at block 110, where the processor 16 executing an activity creation and management application creates a promotional activity based on information received from user input device(s) 14. The promotional activity relates to one or more advertisements and/or promotions communicated for a defined or default time period, at a defined or default location, and via defined or default communications channel(s), for example. As an example, a promotional activity may be a Memorial Day sale for a particular retail store and/or chain that is communicated in a circular inserted into newspapers in the Midwest region of the United States from Monday, May 20, 2013 through Monday, May 27, 2013. In various embodiments, the processor 16 may receive information from user input device(s) specifying one or more of a retail store, a geographic location, a communication channel, start and stop dates, and/or the like. The retail store may be a store or chain of stores, for example. The geographic location can be a city, county, state, region, country, and/or any suitable geographic location. The communication channel may be a circular, a pass-out, direct mail, a catalog, electronic mail, mobile communication, social media posting, in store promotion, or any suitable communications channel. The start and stop dates may indicate when communication of the promotional activity begins and ends. In certain embodiments, a distribution pattern, such as daily, weekly, and the like, can be specified. In various embodiments, the promotional activity may be named and the activity creation and management application can assign identification information, such as an identification number, among other things, to the created promotional activity.

Next, at block 120, the processor 16 executing an activity creation and management application configures the created promotional activity based on information received from user input device(s) 14. The activity creation and management application may be the same application used to create the promotional activity or a separate application with access to the created activities. The application can include modules, templates, tools, and the like configured for execution by the processor 16 to configure the promotional activity. For example, as discussed below with regard to FIG. 3, the application can include modules for managing pages 210, blocks within the pages 220, and hierarchies within the blocks 230 of the created promotional activity. The application may include custom templates 240, messaging tools 250, modules for exporting at least a portion of the configured activity to PDF 260, and modules for launching cooperating applications 270, for example. In various embodiments, the modules, templates, tools, and the like of the activity creation and management application can be executed by the processor 16 in response to user input device commands to configure a promotional activity by assigning business units, products, and the like to advertising and/or promotional space of the promotional activity. For example, a circular can be configured to include two pages. A first page can include advertising and/or promotional space for home appliances and a second page may be split in half to include advertising and/or promotional space for apparel and jewelry. The first page related to home appliances may be configured to specify one or more particular products, such as refrigerators, washers/dryers, and/or any suitable product. The second page related to apparel and jewelry can be configured to specify women's shoes and men's watches, for example. The configured circular can be saved, exported to PDF, and/or launched in a cooperating application, among other things.

Following configuration of the promotional activity, the method of FIG. 2 may, at block 130 commence associating offers with the configured promotional activity, by the processor 16 executing an activity creation and management application based on information received from user input device(s) 14. The activity creation and management application may be the same application used to create and/or configure the promotional activity or a separate application with access to the created and configured activities. For example, as discussed below at least with regard to FIG. 9, block 130 may comprise searching for an existing offer and/or creating an offer to select and associate with the configured promotional activity. Referring to the example above, a configured activity may include a home appliance page in a two page circular. In various embodiments, one or more offers may be selected based on information received from user input device(s) 14 and associated with the home appliance page of the two page circular. Once selected offers are associated with the configured promotional activity, the completed promotional activity may be used to generate and distribute the circular, for example.

Figure 3:
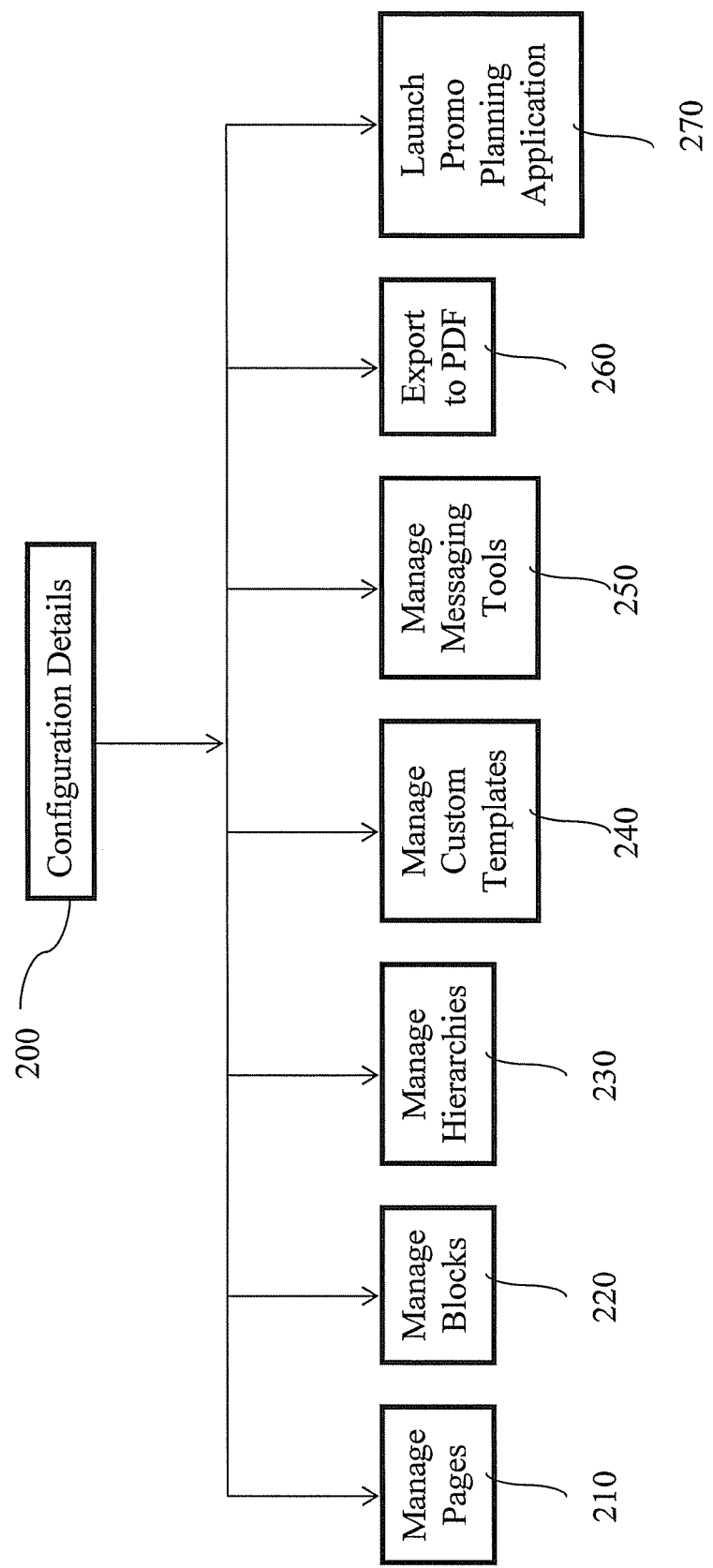
FIG. 3 is a block diagram of an exemplary configuration details application in which a representative embodiment of the present invention may be practiced.

FIG. 3 is a block diagram of an exemplary configuration details application 200 in which a representative embodiment of the present invention may be practiced. The modules of the application of FIG. 3 may be performed using elements of the system 10 of FIG. 1 including, for example, the server(s) 11, network 12, and the workstation(s) 13 comprising user input devices(s) 14, display 15, and processor 16. As illustrated in FIG. 3, the configuration details application 200 includes one or more modules, tools, templates, and/or the like configured for execution by the processor 16 based on user input commands received from user input device(s) 14. The configuration details application 200 may be stored at one or more server(s) 11 and workstation(s) 13. The configuration details application 200 may include, for example, a page management module 210, a block management module 220, a hierarchy management module 230, a custom template module 240, a messaging tools module 250, an export to PDF module, and/or a corresponding application launch module 270, among other things.

Figure 4:
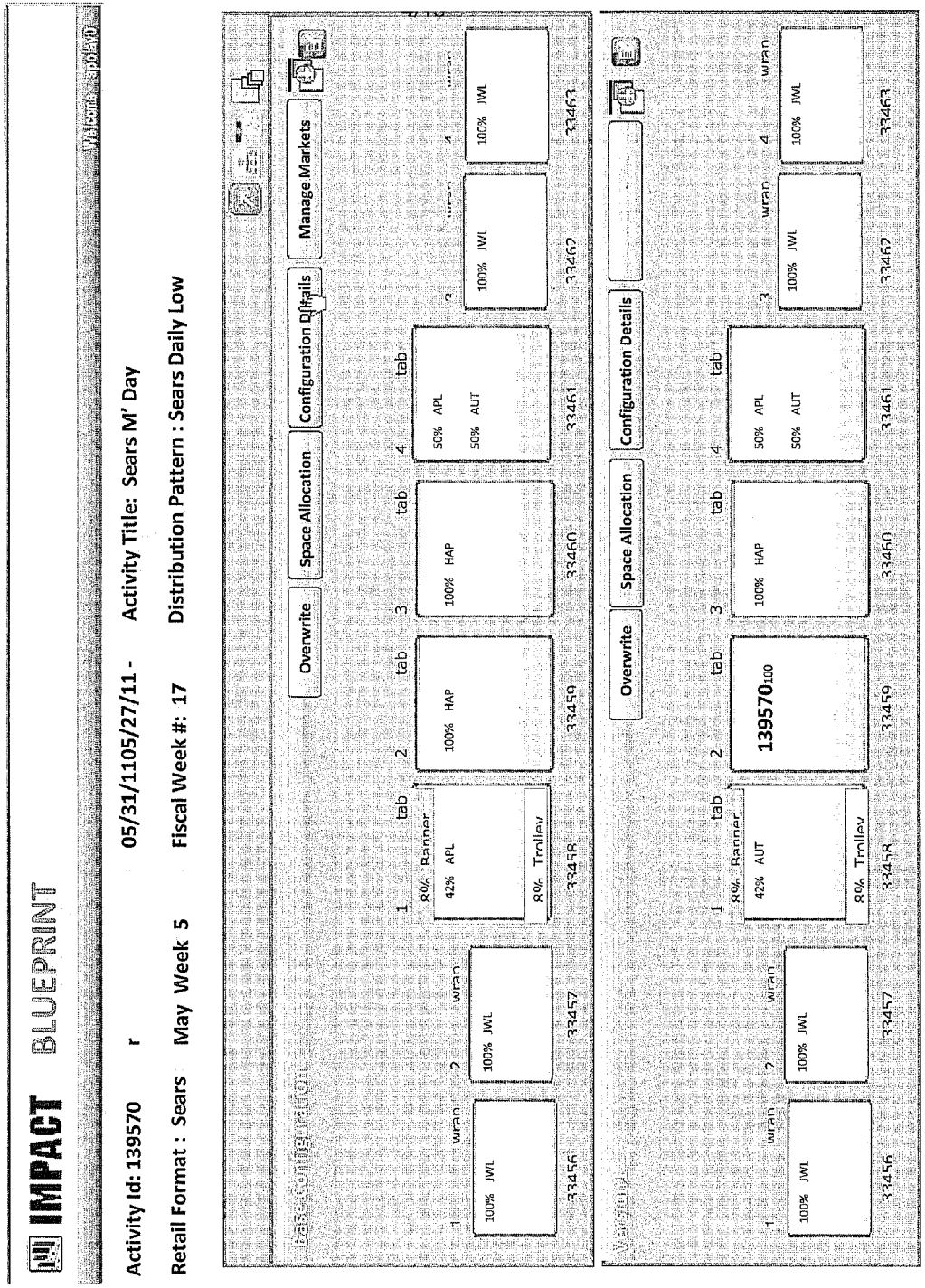
FIG. 4 is a screen shot of an exemplary promotional activity displayed in an activity creation and management application, in accordance with a representative embodiment of the present invention.

FIG. 4 is a screen shot of an exemplary promotional activity displayed in an activity creation and management application, in accordance with a representative embodiment of the present invention. The displayed promotional activity can include an activity identification number, a communication channel type, a start date and end date, an activity title, a retail store or chain indicator, a month week, a fiscal week, and/or a distribution pattern, for example. The displayed promotional activity may include one or more versions of the promotional activity. Each of the one or more versions of the displayed promotional activity can include thumbnails of pages of the promotional activity. In certain embodiments, the one or more versions of the displayed promotional activity may include displayed configuration information if, for example, a default configuration was applied and/or configuration information was previously applied to the promotional activity. For example, the one or more versions of the displayed promotional activity can include configuration information in and/or associated with the thumbnails indicating the page type (e.g., tab, dink, wrap, fake pull-out, etc.), page and/or block allocation information, and/or any suitable configuration information. Referring to FIG. 4, a base configuration version shows eight pages with the first page being a wrap page-type with a single block that was allocated completely to a jewelry (JWL) business unit, for example. In various embodiments, the configuration details application 200 can be accessed by selecting a configuration details link or button associated with a configuration version of the promotional activity, selecting a page associated with a configuration version of the promotional activity, and/or any suitable mechanism for accessing configuration details 200 of a promotional activity.

Figure 5:
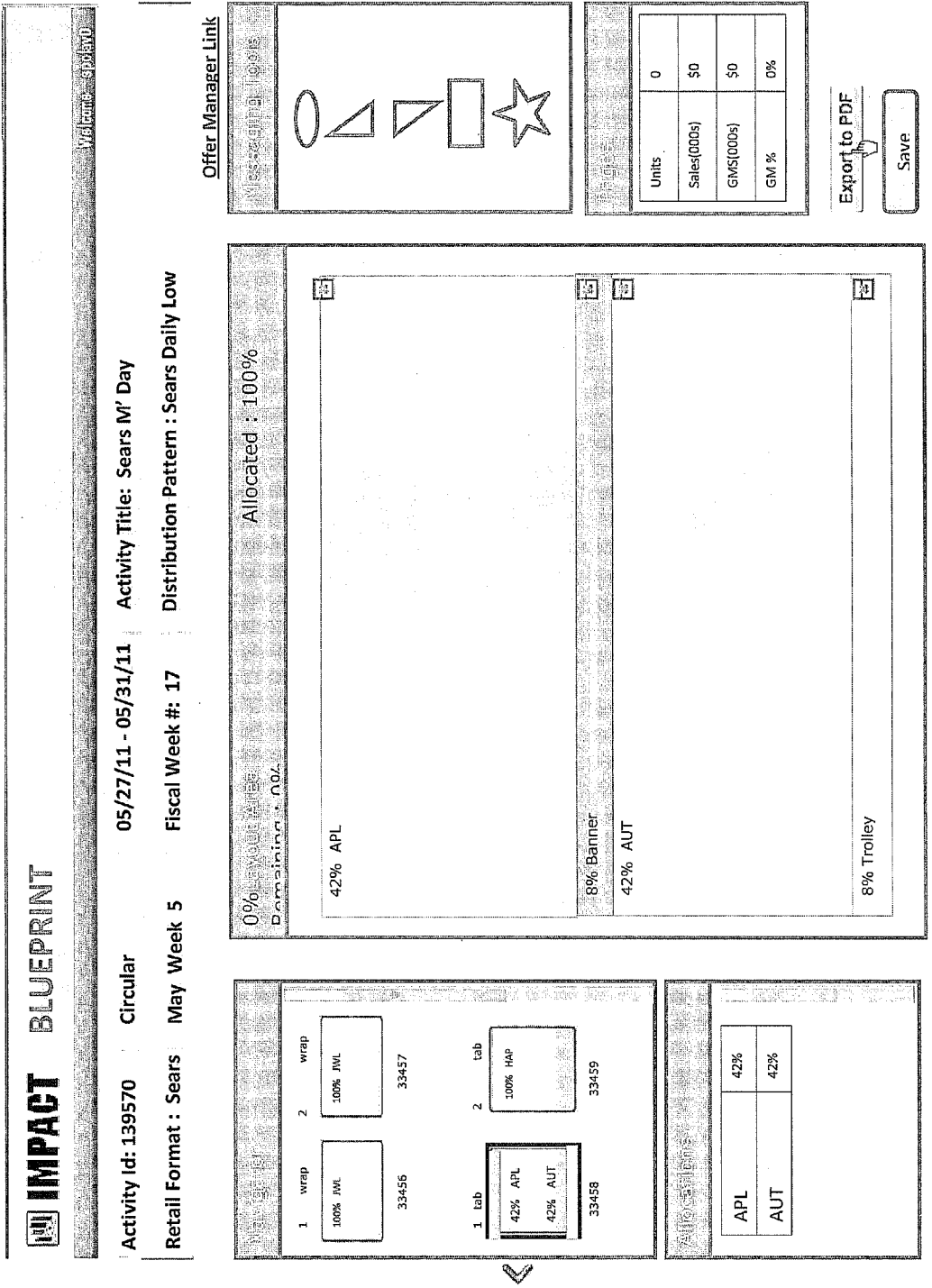
FIG. 5 is a screen shot of an exemplary promotional activity displayed in a configuration details application, in accordance with a representative embodiment of the present invention.

FIG. 5 is a screen shot of an exemplary promotional activity displayed in a configuration details application 200, in accordance with a representative embodiment of the present invention. The displayed promotional activity can include an activity identification number, a communication channel type, a start date and end date, an activity title, a retail store or chain indicator, a month week, a fiscal week, and/or a distribution pattern, for example. The configuration details application 200 may include a navigation section, allocation information section, a layout area, messaging tools, a page financials section, and/or links, buttons or the like for saving the configuration details, exporting to PDF, and launching a corresponding application, for example.

The navigation section may correspond with the page management module 210 of the configuration details application 200, as illustrated in FIG. 3. The page management module 210 is configured for execution by the processor 16 based on user input commands received from user input device(s) 14 to lock/unlock pages, view adjacent pages simultaneously (spread view), delete and/or recover deleted pages, edit page start and end dates, and release and/or recall pages for offer association, for example. Referring to FIG. 5, the navigation section may indicate the page currently being viewed in the layout area and provide tools for navigating to other pages of the promotional activity, for example. The navigation section can provide access to menus, links, buttons, and/or the like for managing pages of the promotional activity. For example, pointing a mousing device to a page in the navigation section and clicking on a right button of the mousing device can provide access to a menu of page management options corresponding with the selected page.

In various embodiments, the page management options can include an option for releasing a page for offer submission. Selection of the releasing a page for offer submission option may allow access to the blocks of the page by a corresponding application for adding offers to the blocks. The page management options may include an option for recalling a page from offer submission. Selection of the recalling a page from offer submission option can prevent the corresponding application from accessing the page to add offers to the block(s).

In certain embodiments, the page management options can include an option for deleting a page. Selection of the page delete option may soft delete the page and any blocks and offers within the page. In various embodiments, the deleted page can be displayed as disabled at the end of a sequence of pages of the promotional activity. The page management options may include an option for recovering a deleted page. Selection of the page recovery option can enable a disabled page. In certain embodiments, the recovered page can be displayed as enabled at the end of the sequence of pages of the promotional activity. The page management options can include a permanent page deletion option for permanently deleting a soft deleted page. Selection of the permanent page deletion option may delete the permanently delete the page and any blocks and offers within the page, such that the page cannot be recovered.

In various embodiments, the page management options can include an option for unlocking a page. Selection of the page unlock option may allow a user access to a locked page based on access rights of the user, for example. In various embodiments, if a user does not have access to unlock a page, a request for unlock option can be selected to send a request to an administrator with the appropriate access rights to unlock the page.

In certain embodiments, the page management options can include an option for viewing a page. Selection of the view page option may prompt the configuration details application 200 to provide an enlarged view of the layout area of the selected page. The view page option can provide access to block management options corresponding with the manage blocks module 220 of the configuration details application 200, as illustrated in FIG. 3 and as discussed below.

In various embodiments, the page management options can include an option for editing the distribution pattern and/or the start date/time and end date/time of a page. Selection of the start/end date and time option may prompt the configuration details application 200 to provide a start/end date and time window. The start/end date and time window can provide information such as the current start date, start time, end date, and/or end time, for example. The start/end date and time window may provide options for selecting a new start date, start time, end date, and/or end time. The start/end date and time window can provide options for selecting a distribution pattern, for example, by providing days of the week for selected distribution. In various embodiments, the start/end date and time window may provide options for saving and/or canceling changes.

In certain embodiments, the page management options can include an option for providing a spread view of multiple pages of a promotional activity. Selection of the spread view option may prompt the configuration details application 200 to provide a spread view menu window. The spread view menu window can provide options for selecting the pages to view in spread view. In various embodiments, the options for selecting the pages to view in spread view may include viewing the spread for an entire configuration version, viewing the pages having a selected page format within a configuration version, and/or viewing pages across multiple configuration versions, among other things. Once the pages to view in spread view are selected, an enlarged spread view of the layout area of the selected pages can be provided by the configuration details application 200. In certain embodiments, the enlarged spread view can include buttons, arrows, or the like, for navigating to previous and next pages in a book format, for example. The spread view option can provide access to block management options corresponding with the manage blocks module 220 of the configuration details application 200, as illustrated in FIG. 3 and as discussed below.

Figure 7:
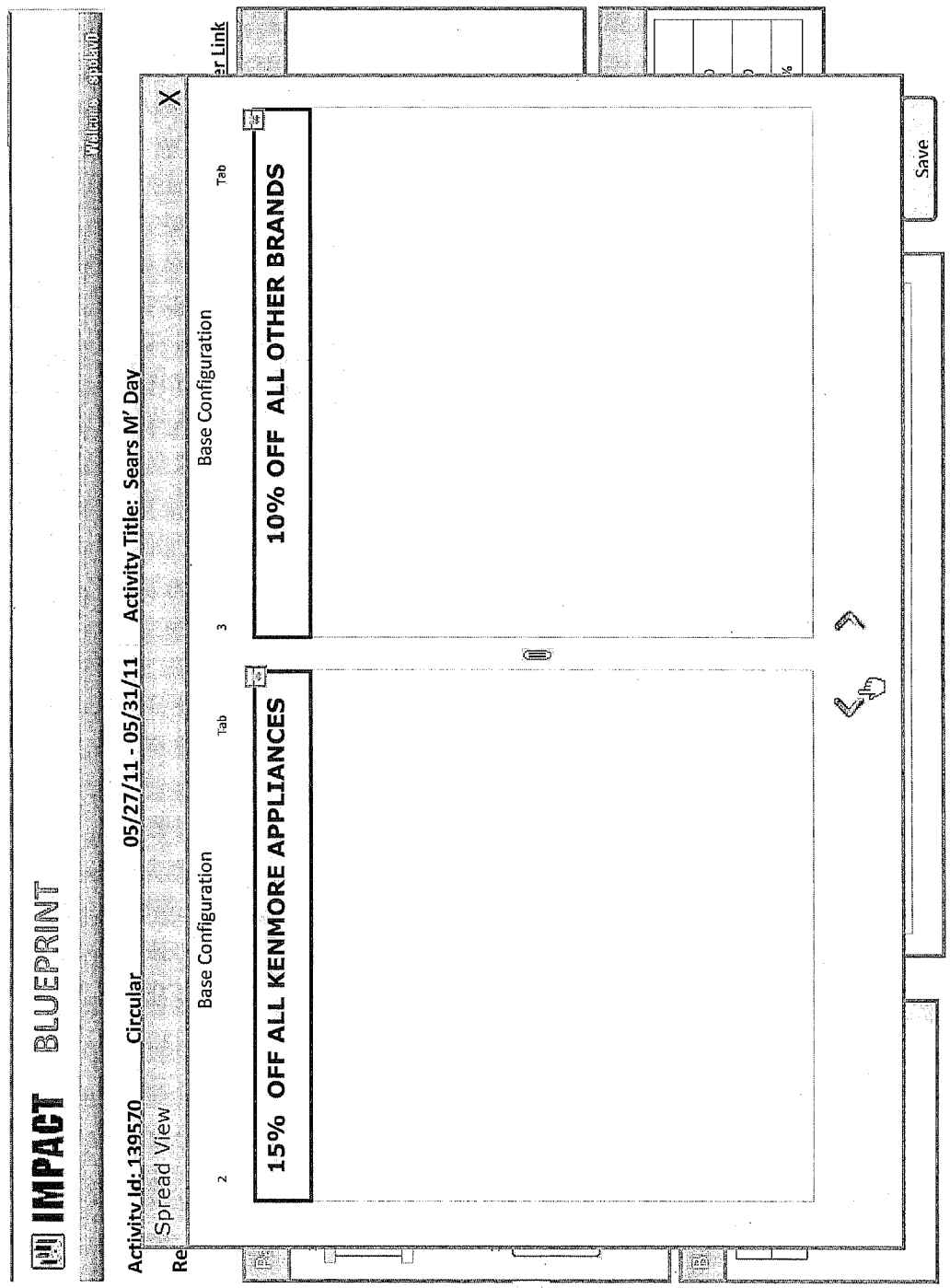
FIG. 7 is a screen shot of a spread view of multiple pages of an exemplary promotional activity displayed in a configuration details application, in accordance with a representative embodiment of the present invention.

FIG. 7 is a screen shot of a spread view of multiple pages of an exemplary promotional activity displayed in a configuration details application 200, in accordance with a representative embodiment of the present invention. Referring to FIG. 7, the configuration details application 200 provides an enlarged spread view of the layout area of selected pages. The enlarged spread view includes arrows for navigating to previous and next pages in a book format. The enlarged spread view includes information regarding the page number, configuration version, and page type of the pages of the promotional activity being displayed in the spread view.

Referring again to FIG. 5, the navigation section may also correspond with the custom template management module 240 of the configuration details application 200, as illustrated in FIG. 3. The custom template management module 240 is configured for execution by the processor 16 based on user input commands received from user input device(s) 14 to apply, save, replace, and/or delete custom templates, for example. Referring to FIG. 5, the navigation section may indicate the page currently being viewed in the layout area and provide tools for navigating to other pages of the promotional activity, for example. The navigation section can provide access to menus, links, buttons, and/or the like for managing custom templates. For example, pointing a mousing device to a page in the navigation section and clicking on a right button of the mousing device can provide access to a menu of custom template options corresponding with the selected page.

In various embodiments, the custom template options can include an option for applying a custom template to the selected page. Selection of the apply custom template option may prompt the configuration details application 200 to provide a custom template window. The custom template window can include menus, buttons, prompts, and the like for facilitating user search and/or selection of a custom template to apply to the selected page. The custom templates can include configuration details, such as page type, configured block arrangements, selected allocations, messaging tools and/or any suitable configuration details of a page and/or any blocks within a page. In various embodiments, the custom template window may include a text box for searching by template name, a text box for searching by user identification information, a search button, and/or a cancel button, for example. In response to a search, the custom template window can display search results and menus, buttons, prompts, and the like for selecting a custom template and/or deleting the search, for example. The configuration details application 200 can apply the selected custom template to the selected page based on user input commands received from user input device(s) 14.

In certain embodiments, the custom template options can include an option for saving a custom template. Selection of the save custom template option may prompt the configuration details application 200 to provide a save custom template window. The save custom template window can include a text box for naming the custom template, a save button, and/or a cancel button, for example.

In various embodiments, the custom template options can include an option for replacing a custom template. Selection of the replace custom template option may prompt the configuration details application 200 to provide a replace custom template window. The replace custom template window can include menus, buttons, prompts, and the like for facilitating user search and/or selection of a custom template to replace. In various embodiments, the replace custom template window may include a text box for searching by template name, a text box for searching by user identification information, a search button, and/or a cancel button, for example. In response to a search, the replace custom template window can display search results and menus, buttons, prompts, and the like for selecting a custom template to replace and/or deleting the search, for example. The configuration details application 200 can replace the selected custom template with a template on the current page based on user input commands received from user input device(s) 14.

In certain embodiments, the custom template options can include an option for deleting a custom template. Selection of either the apply custom template option or the replace custom template option may prompt the configuration details application 200 to provide a custom template window or a replace custom template window, respectively. The windows can include menus, buttons, prompts, and the like for facilitating user search and/or selection of a custom template to delete. In various embodiments, the windows may include a text box for searching by template name, a text box for searching by user identification information, a search button, and/or a cancel button, for example. In response to a search, the windows can display search results and menus, buttons, prompts, and the like for selecting a custom template to delete and/or deleting the search, for example. The configuration details application 200 can delete the selected custom template based on user input commands received from user input device(s) 14. In various embodiments, the configuration details application 200 may provide a confirmation message to guard against accidental deletion of custom templates.

Referring again to FIG. 5, the layout area can display a selected page layout. For example, referring to FIG. 5, the layout area illustrates a page having a top block with a size of 42% of the page, a central banner with a size of 8% of the page, a bottom block with a size of 42% of the page, and a trolley with a size of 8% of the page. The layout area indicates that 100% of the selected page has been allocated with 0% remaining. The layout area, as well as the enlarged view of the layout area and the spread view as discussed above, may correspond with the block management module 220 of the configuration details application 200, as illustrated in FIG. 3. The block management module 220 is configured for execution by the processor 16 based on user input commands received from user input device(s) 14 to view blocks, split blocks, merge blocks, resize blocks, delete blocks, edit block start and end dates, and release and/or recall blocks for offer association, for example. Referring to FIG. 5, the layout area can provide access to menus, links, buttons, and/or the like for managing blocks within a page of the promotional activity. For example, pointing a mousing device to a block within the layout area and clicking on a right button of the mousing device can provide access to a menu of block management options corresponding with the selected block.

In various embodiments, the block management options can include a view block option for viewing a block. Selection of the view block option may prompt the configuration details application 200 to provide an enlarged view of the layout area of the selected block. In certain embodiments, the enlarged view can include messaging tool(s) present in the block, any hierarchies, sub-allocations, offer copy details, financial details, and/or a block status indicator. As an example, the enlarged view can include a messaging tool indicating a percentage off of diamond tennis bracelets and may indicate a jewelry hierarchy, fine jewelry and gemstones sub-allocations, offer copy details providing instructions for associating an offer with the block, and a green flag indicating that the block has been released for offer association. The view block option can provide access to additional menu options for adding block details, editing block detail, removing block details, editing the distribution pattern and/or the start date/time and end date/time of the block, releasing the block for offer association, and/or recalling a block from offer association, for example.

In certain embodiments, the block management options can include a split block option for splitting a block. Selection of the split block option may prompt the configuration details application 200 to provide a split block details window. The split block details window can include menus, buttons, prompts, and the like for facilitating user selection of a number of rows the block is to be split and a number of columns the block is to be split. The split block details window may include a split button, for example, configured to receive a user input command for executing the split as specified by the selected row and column block split information.

In various embodiments, the block management options can include a merge block option for merging blocks. Selection of the merge block option when two or more blocks have been selected merges the selected blocks into a single block. In various embodiments, allocation percentages of the merged blocks may be summed by the configuration details application 200.

In certain embodiments, a block can be resized by selecting and repositioning one or more of the four corners and/or four sides of a block. For example, corners and sides of the block may be dragged to adjust the size of a block. The configuration details application 200 may display warning messages if, for example, a block is resized such that it overlaps with an adjacent block on a page.

In various embodiments, a block can be deleted. For example, a block may include any suitable delete symbol at a corner of the block. Selection of delete symbol can delete the block. In various embodiments, the configuration details application 200 may provide a confirmation message to guard against accidental deletion of blocks.

In certain embodiments, the block management options can include an option for editing the distribution pattern and/or the start date/time and end date/time of a block. Selection of the start/end date and time option may prompt the configuration details application 200 to provide a start/end date and time window. The start/end date and time window can provide information such as the current start date, start time, end date, and/or end time, for example. The start/end date and time window may provide options for selecting a new start date, start time, end date, and/or end time. The start/end date and time window can provide options for selecting a distribution pattern, for example, by providing days of the week for selected distribution. In various embodiments, the start/end date and time window may provide options for saving and/or canceling changes In various embodiments, the block management options can include an option for releasing a block for offer submission. Selection of the releasing a block for offer submission option may allow access to the block by a corresponding application for adding offers to the block. The block management options may include an option for recalling a block from offer submission. Selection of the recalling a block from offer submission option can prevent the corresponding application from accessing the block to add offers to the block.

In certain embodiments, the block management options can include an option for unlocking a block. Selection of the block unlock option may allow a user access to a locked block based on access rights of the user, for example. In various embodiments, if a user does not have access to unlock a block, a request for unlock option can be selected to send a request to an administrator with the appropriate access rights to unlock the block.

The layout area may also correspond with the hierarchy management module 230 of the configuration details application 200, as illustrated in FIG. 3. The hierarchy management module 230 is configured for execution by the processor 16 based on user input commands received from user input device(s) 14 to add block details, edit block details, remove block details, and delete block details, for example. Referring to FIG. 5, the layout area can provide access to menus, links, buttons, and/or the like for managing hierarchies of a block within a page of the promotional activity. For example, pointing a mousing device to a block within the layout area and clicking on a right button of the mousing device can provide access to a menu of hierarchy management options corresponding with the selected block.

In various embodiments, the hierarchy management options can include an add block details option for adding hierarchy details to a block. Selection of the add block details option may prompt the configuration details application 200 to provide an add/edit details window. The add/edit details window can include menus, buttons, prompts, and the like for facilitating user selection of one or more allocations, and/or entry of offer association instructions and/or promotional activity generation instructions, for example. The allocations may include a main allocation and one or more sub-allocations. For example, a main allocation may be a home appliances business unit, with a first sub-allocation of washing machines, a second sub-allocation of top loaders, and a third sub-allocation of Kenmore. The offer association instructions may include instructions to a merchant for associating a particular offer, such as 10% off, with the block. The promotional activity generation instructions can include instructions to an agency for using an image of a particular Kenmore top loading washing machine when generating the circular. In various embodiments, the add/edit details window can provide options for saving and/or canceling the added details.

In certain embodiments, the hierarchy management options can include an edit block details option for editing hierarchy details of a block. Selection of the edit block details option may prompt the configuration details application 200 to provide an add/edit details window. The add/edit details window can include menus, buttons, prompts, and the like for facilitating user selection of one or more allocations, and/or entry of offer association instructions and/or promotional activity generation instructions, for example. In various embodiments, the add/edit details window can provide options for saving and/or canceling the edited details.

In various embodiments, the hierarchy management options can include a remove block details option for removing sub-allocation details, if any, of a block. Selection of the remove block details option may prompt the configuration details application 200 to remove the sub-allocations, if any, of a block. In various embodiments, the configuration details application 200 may provide a confirmation message to guard against accidental removal of block sub-allocations.

In certain embodiments, the hierarchy management options can include a delete block details option for deleting selected hierarchy details of a block. Selection of the delete block details option may prompt the configuration details application 200 to provide an add/edit details window. The add/edit details window can include menus, buttons, prompts, and the like for facilitating deletion of one or more allocations, for example. In various embodiments, the configuration details application 200 may provide a confirmation message to guard against accidental deletion of block details.

The messaging tools section may correspond with the manage messaging tools module 250 of the configuration details application 200, as illustrated in FIG. 3. The messaging tools section can provide tools configured for adding text to a page and/or blocks within a page, among other things. For example, referring to FIG. 5, the messaging tools section includes messaging tools of various shapes having a hidden rectangular text box placed at the center of the tool. The messaging tools may be selected and added to a page and/or blocks within a page. For example, an oval messaging tool may be dragged and dropped to a position within the apparel block of the page illustrated in the layout area. In various embodiments, the messaging tool can be resized, repositioned, and/or deleted after being added to a position in the page displayed in the layout area. The text added to a messaging tool can be formatted to specify, for example, color, size, font, alignment, style, and any suitable text formatting.

Figure 6:
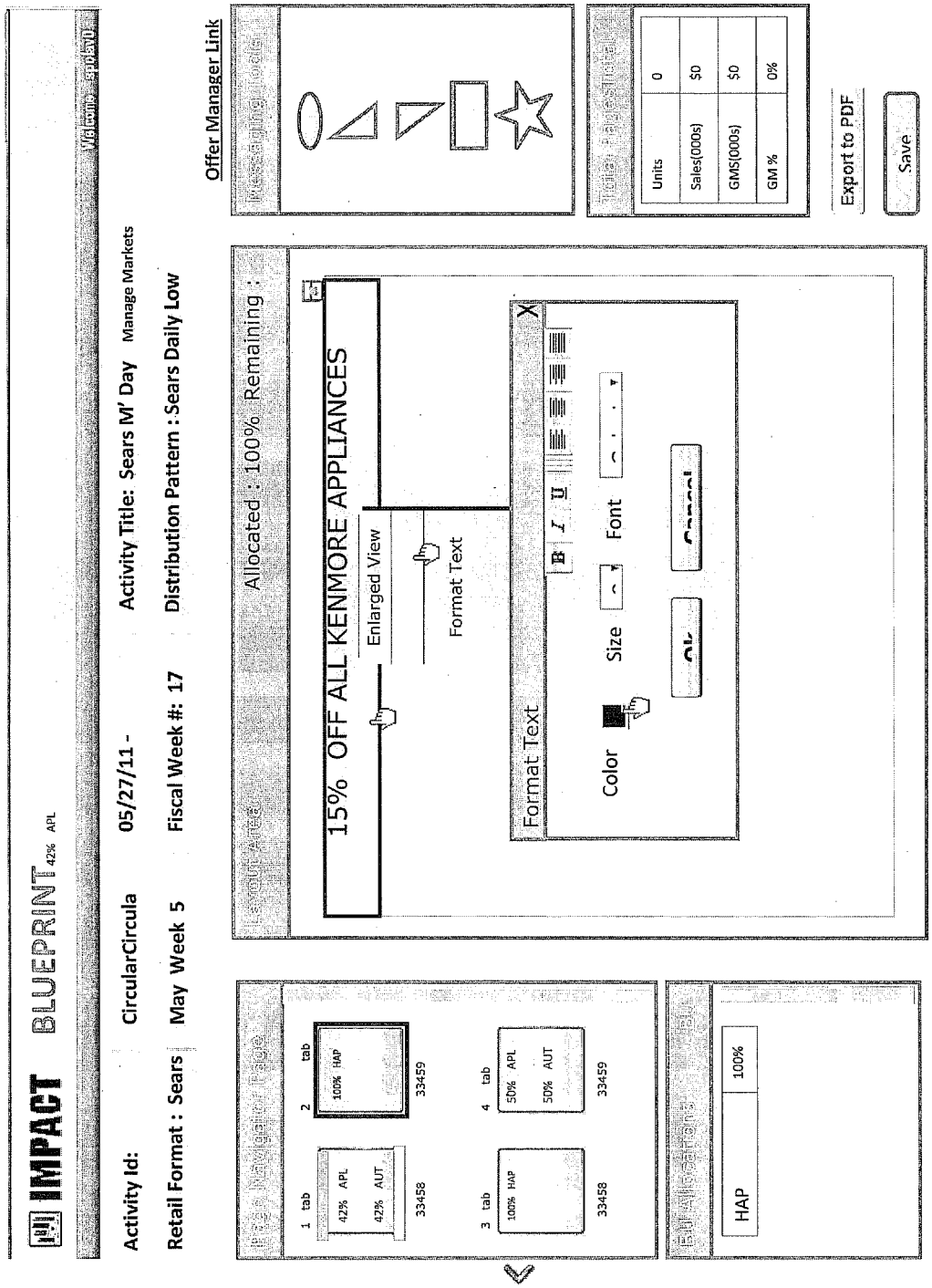
FIG. 6 is a screen shot of text formatting of a messaging tool added to a page of an exemplary promotional activity displayed in a configuration details application, in accordance with a representative embodiment of the present invention.

FIG. 6 is a screen shot of exemplary text formatting of a messaging tool added to a page of an exemplary promotional activity displayed in a configuration details application 200, in accordance with a representative embodiment of the present invention. Referring to FIG. 6, a rectangular messaging tool can be added to a home appliance block of a selected page displayed in the layout area of the configuration details application 200. The text "15% OFF ALL KENMORE APPLIANCES" may be entered into a hidden text box within the rectangular messaging tool. A menu can be accessed, such as by clicking a right button of a mousing device, and a format text option is selected. A pop-up box, for example, may be displayed to provide color, size, font, style, alignment, and justification options for formatting the text. The screen shot of the exemplary promotional activity displayed in the configuration details application 200 illustrated in FIG. 6 shares various characteristics with the screen shot of the exemplary promotional activity displayed in the configuration details application 200 illustrated in FIG. 5 as described above.

Referring again to FIG. 5, the allocation information section can indicate information regarding the business units allocated to currently viewed page. For example, the allocation information section indicates that 42% of the page is allocated to the apparel business unit and 42% of the page is allocated to the automotive business unit. The page financials section can provide information regarding the forecasted sales of one or more products allocated to one or more blocks on a page displayed in the layout area. The page financials may include a forecasted number of units sold, sales in dollars, gross margin sales in dollars, gross margin percentage, and/or any suitable financial information.

In various embodiments, links, buttons, menus, and the like can be provided in the configuration details application 200 to allow a user to save a configured promotional activity, export one or more selected pages of a configured promotional activity to PDF, and/or launch a corresponding application, among other things. For example, referring to FIG. 5, an Offer Manager Link is provided to launch a corresponding application configured to facilitate association of offers with configured promotional activities. In various embodiments, the Offer Manager Link may correspond with the launch promo planning application module 270 of the configuration details application 200, as illustrated in FIG. 3. Referring again to FIG. 5, an export to PDF button is provided to facilitate the generation of a PDF that can include selected configuration versions of the promotional activity, selected pages of the configuration version(s) selected hierarchies of the selected version(s), optional financial information, and the like. In certain embodiments, the export to PDF button can correspond with the export to PDF module 260 of the configuration details application 200, as illustrated in FIG. 3. Referring again to FIG. 5, a Save button is provided to allow a user to save a configured promotional activity.

Figure 8:
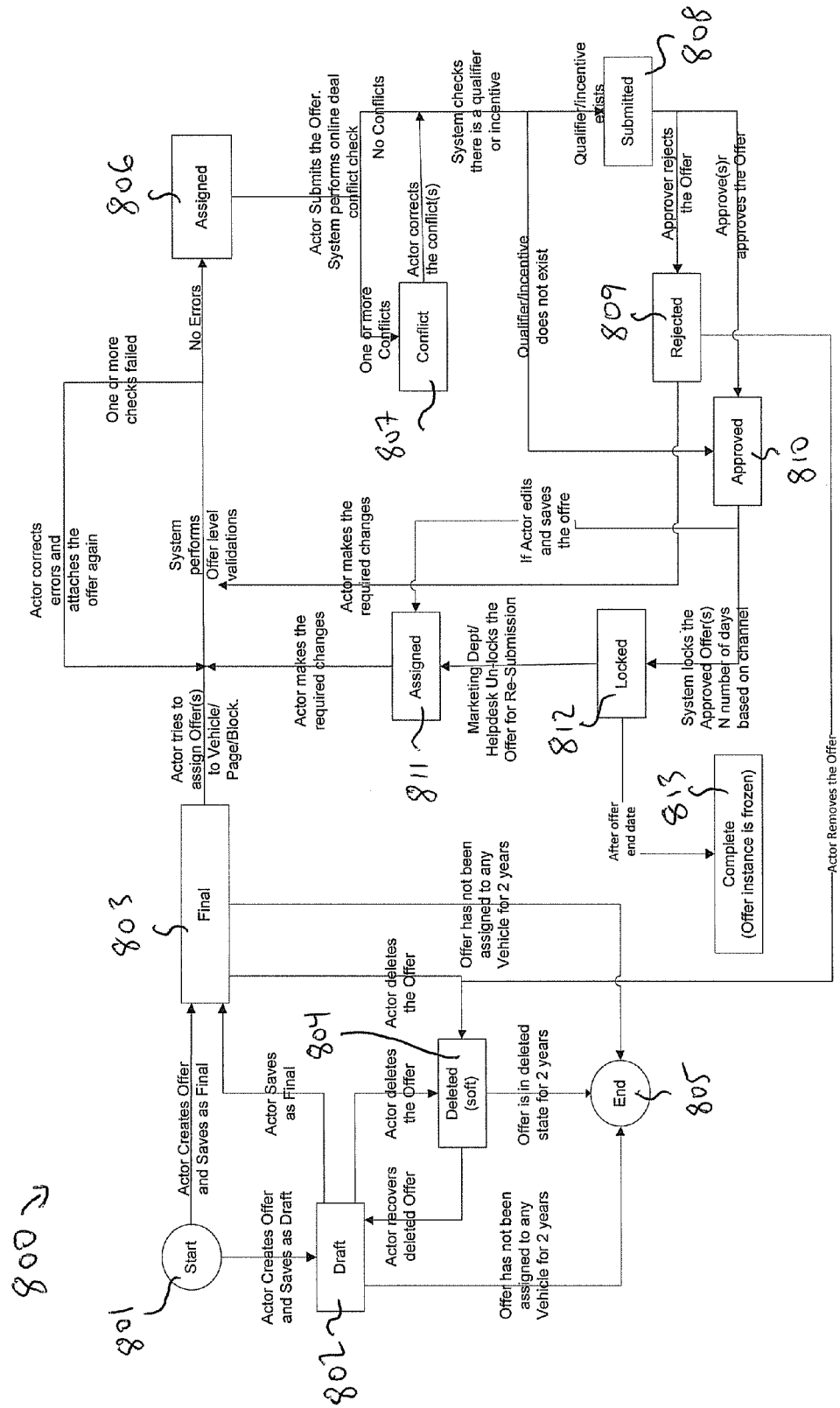
FIG. 8 is a flowchart illustrating an exemplary method for associating an offer with a configured promotional activity and reviewing the association for conflicts and approval, in accordance with a representative embodiment of the present invention.

FIG. 8 is a flowchart illustrating an exemplary method for associating an offer with a configured promotional activity and reviewing the association for conflicts and approval, in accordance with a representative embodiment of the present invention. The actions of the method of FIG. 8 may be performed using elements of the system 10 of FIG. 1 including, for example, the server(s) 11, network 12, and the workstation(s) 13 comprising user input devices(s) 14, display 15, and processor 16.

The method of FIG. 8 begins at block 801, where the processor 16 executing an offer manager application creates an offer based on information received from user input device(s) 14. The created offer can be saved by the processor 16 at the workstation 13 and/or servers 11 as a draft at block 802 or as final at block 803, for example. At block 802, if the offer is saved as a draft, the offer may be finalized and saved as final at block 803. Alternatively, the saved draft can be permanently deleted if the draft offer has not been assigned after a predetermined period of time at block 805, or soft deleted by a user at block 804, for example. At block 804, the soft deleted offer may be recovered and returned to block 802 or, after a predetermined period of time, the soft deleted offer may be permanently deleted at block 805.

At block 803, a finalized offer may be soft deleted at block 804, permanently deleted after a predetermined period of time at block 805, or the offer can be submitted for assignment to a page and/or block of a configured promotional activity, for example. The offer submitted for assignment is checked for offer input errors and if no errors are detected, the submitted offer is assigned at block 806. Alternatively, if errors are detected, the finalized offer can be corrected and resubmitted until the submitted offer contains no errors. After a finalized offer is assigned to a page and/or block of a configured promotional activity at block 806, the assigned offer may be submitted. The submitted assigned offer can be checked for conflicts with related offers and if a conflict is detected at block 807, the assigned offer can be corrected and resubmitted. If no deal conflicts exist with the submitted assigned offer, the submitted assigned offer may be automatically approved at block 810 if there is no qualifier or incentive associated with the offer.

At block 808, submitted assigned offers are reviewed if the offer is associated with a qualifier and/or incentive. If the qualifier and/or incentive are rejected at block 809, the qualifier and/or incentive can be corrected and reassigned to a page and/or block of a configured promotional activity at block 806. If the qualifier and/or incentive is approved at block 810, the submitted assigned offer can be locked at block 812 based on the duration of the offer distributed via the communication channel, such as a circular, catalog, direct mail, electronic mail, and any suitable communication channel. The locked assigned offer can be unlocked at block 811 for reassignment with a configured with a page and/or block of a configured promotional activity at block 806. After the offer end date, the offer instance may be frozen at block 813.

Figure 9:
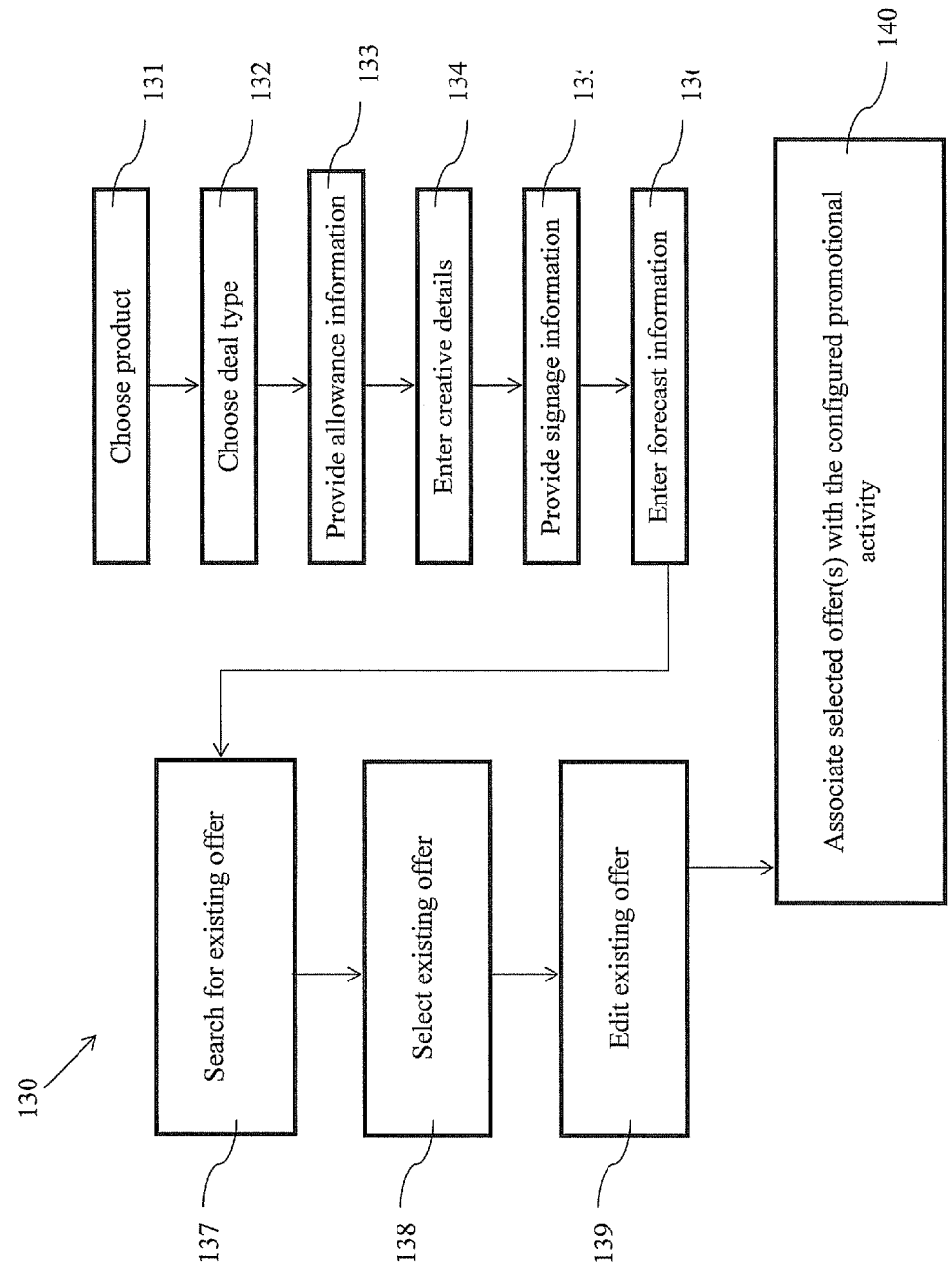
FIG. 9 is a flowchart illustrating an exemplary method for associating an offer with a configured promotional activity, in accordance with a representative embodiment of the present invention.

FIG. 9 is a flowchart illustrating an exemplary method for associating an offer with a configured promotional activity, in accordance with a representative embodiment of the present invention. The actions of the method of FIG. 9 may be performed using elements of the system 10 of FIG. 1 including, for example, the server(s) 11, network 12, and the workstation(s) 13 comprising user input devices(s) 14, display 15, and processor 16.

The method of FIG. 9 begins at blocks 131-136, where the processor 16 executing an offer manager application creates an offer based on information received from user input device(s) 14. At block 131, a product can be chosen in the offer manager application. For example, a product may be selected in the offer manager application executed by the processor 16 based on information received from user input device(s) 14. The product can be a specific product or group of products, among other things. For example, the chosen product can be jewelry generally, a particular brand of watch, women's watches generally, and/or a specific brand and model of a women's watch. The product may be located by searching for an associated product number, product name, hierarchy code, or the like in a search text box. Additionally and/or alternatively, drop down menus, collapsible lists, and/or any suitable search mechanism can be used to search and select a product.

At block 132, a deal type can be chosen in the offer manager application. For example, a deal type may be selected in the offer manager application executed by the processor 16 based on information received from user input device(s) 14. Deal types may include a deal and the associated attributes of the deal. Deal can include a percentage off, a dollar amount off, a price point, and the like. The deal can be selected by checking a checkbox, selecting from a drop down menu, selecting from a list, or any suitable selection mechanism. The offer manager application can provide corresponding attributes for selection and/or completion in response to receiving an indication of a selected deal. If the selected deal is a percentage off, the offer manager application may provide a text box and/or selection mechanism for specifying the percentage. The offer manager application can provide a text box and/or selection mechanism for specifying a dollar amount if the selected deal is a dollar amount off. If the selected deal is a price point, the offer manager application may provide a text box and/or selection mechanism for specifying the price.

In various embodiments, the deals may include complex deals, such as (1) offers based on the number of units purchased; (2) offers based on the dollar amount spent; (3) buy X, get X offers, (4) buy X, get Y offers; (5) buy X and Y, get Z offers; (6) buy X, Y and Z, get A offers; and (7) buy X, Y, Z and A, get B offers, for example. The offer manager can provide a textbox and/or selection mechanism for specifying a unit threshold and a price point, percent off, and/or amount off if the selected complex deal is an offer based on the number of units purchased. If the selected complex deal is based on a dollar amount spent, the offer manager application may provide a text box and/or selection mechanism for specifying a dollar spent threshold and a price point, percent off, and/or amount off. The offer manager can provide a textbox and/or selection mechanism for specifying a buy quantity, a get quantity, and a percent off or dollar amount off if the selected complex deal is a buy X, get X offer. If the selected complex deal is a buy X, get Y offer, the offer manager may provide a textbox and/or selection mechanism for specifying a buy product (X), a buy quantity, a get product (Y), a get quantity, and a percent off or dollar amount off of the get product (Y).

The offer manager can provide a textbox and/or selection mechanism for specifying a first buy product (X), a first buy quantity, a second buy product (Y), a second buy quantity, a get product (Z), a get product quantity, and a percent off or dollar amount off of the get product (Z) if the selected complex deal is a buy X and Y, get Z offer. If the selected complex offer is a buy X, Y and Z, get A offer, the offer manager may provide a textbox and/or selection mechanism for specifying a first buy product (X), a first buy quantity, a second buy product (Y), a second buy quantity, a third buy product (Z), a third buy quantity, a get product (A), a get product quantity, and a percent off or a dollar amount off of the get product (A). The offer manager can provide a textbox and/or selection mechanism for specifying a first buy product (X), a first buy quantity, a second buy product (Y), a second buy quantity, a third buy product (Z), a third buy quantity, a fourth buy product (A), a fourth buy quantity, a get product (B), a get product quantity, and a percent off or dollar amount off of the get product (B) if the selected complex deal is a buy X, Y, Z and A, get B offer.

In certain embodiments, after a deal type is chosen at block 132, allowance information can be provided at block 133. For example, allowance information may be entered in the offer manager application executed by the processor 16 based on information received from user input device(s) 14. Allowance information can include a dollar amount of vendor financial assistance for placement and/or use of an advertisement. For example, a vendor, such as Kenmore, could provide financial assistance for including an offer for Kenmore refrigerators in a home appliance block on a page of a circular.

Next, at block 134, creative details associated with an offer can be entered in the offer manager application. For example, creative details may be provided in the offer manager application executed by the processor 16 based on information received from user input device(s) 14. Creative details can include logos, images, and/or special instructions, among other things. Special instructions may include, for example, instructions for directing a photo shoot to capture a product image for inclusion with an offer in the promotional activity. The special instructions can include, for example, instructions to a vendor for selecting a previous image used in a previous promotional activity for inclusion with an offer in the current promotional activity. As another example, the special instructions may include instructions to a vendor regarding the wording of the offer included in the promotional activity. The creative details can include product descriptions, product features, and identification of one or more products to be picture featured, for example.

At block 135, signage information may be provided in the offer manager application. For example, signage information can be entered in the offer manager application executed by the processor 16 based on information received from user input device(s) 14. Signage information can include information related to the offer being created for use in generating corresponding signage to display at retail store(s). For example, information regarding the selected product, deal type, and creative details can be provided such that the product, deal type, and offer appearance conveyed in the promotional activity corresponds with the product, deal type, and offer appearance conveyed in the signage displayed at retail store(s).

At block 136, forecast information can be entered in the offer manager application and/or calculated by the offer manager application based on information provided to the offer manager application. For example, forecast information may be provided in the offer manager application executed by the processor 16 based on information received from user input device(s) 14. Forecast information can include, for example, a forecast name and/or identification information; start and end dates for the forecast; a profitability indicator based on a projected margin value; a number of baseline units forecasted; a number of incremental units; a total number of projected units (baseline units+incremental units); a projected dollar amount of sales based on projected units and price; a projected dollar amount of margin based on projected units, cost, and price of the items in the offer; a projected margin percentage; and/or any suitable forecast information.

Figure 10:
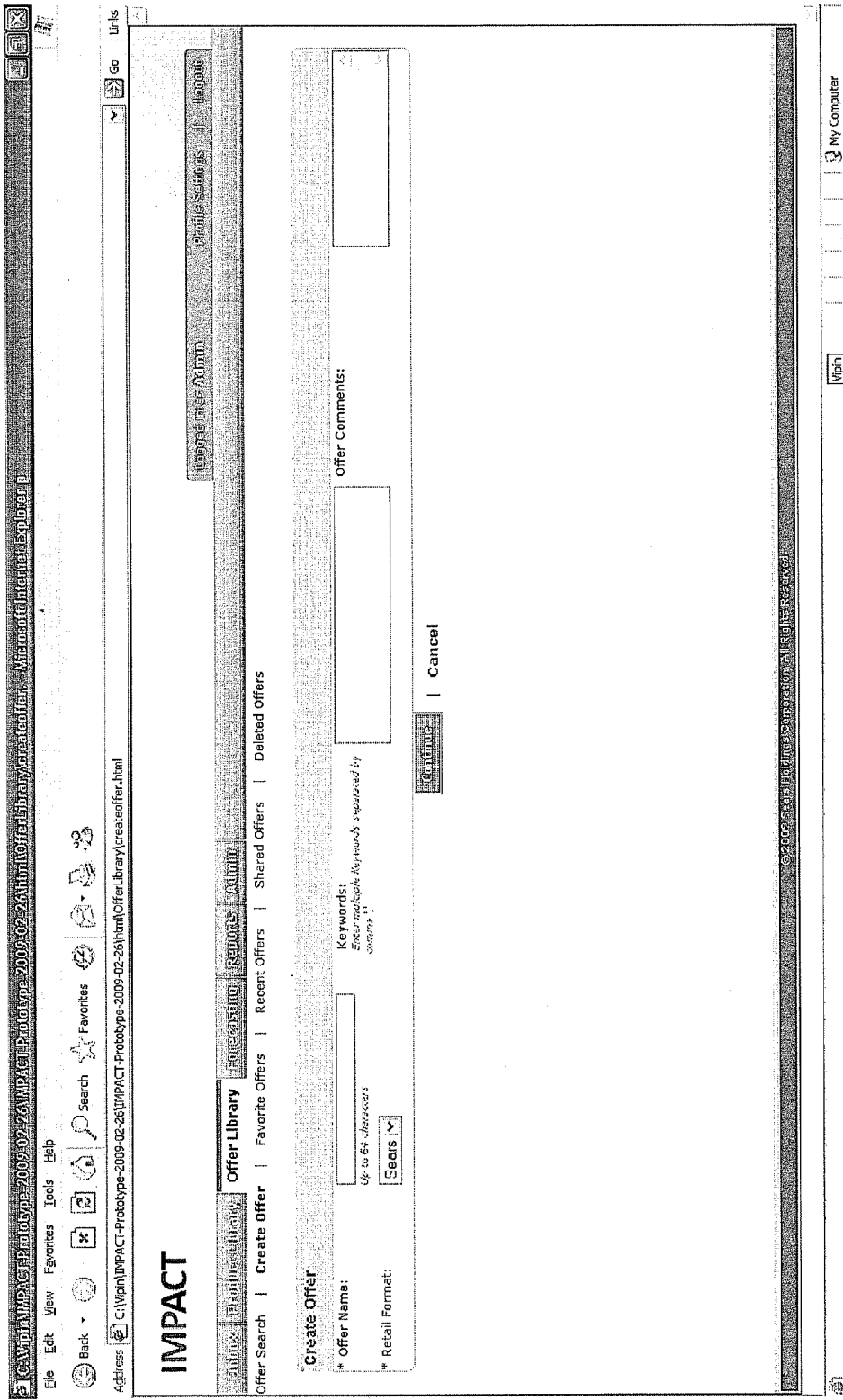
FIG. 10 is a screen shot of an offer creation window displayed in an offer manager application, in accordance with a representative embodiment of the present invention.

FIG. 10 is a screen shot of an offer creation window displayed in an offer library of an offer manager application, in accordance with a representative embodiment of the present invention. Referring to FIG. 10, the offer manager application provides an offer creation window based on an offer creation selection received from user input device(s) 14. The offer creation window can include menus, buttons, prompts, and the like for assigning an offer name, specifying a retail format, providing keywords to identify the offer when searching for existing offers, and providing comments regarding the offer being created, for example. The offer manager application may provide links, buttons, menus, and the like to provide access to offer search, favorite offers, recent offers, shared offers, and deleted offers, for example. The offer manager application may provide links, buttons, menus, and the like to provide access to a message inbox, product library, forecasting information, reports, and administrative information, for example.

Figure 11:
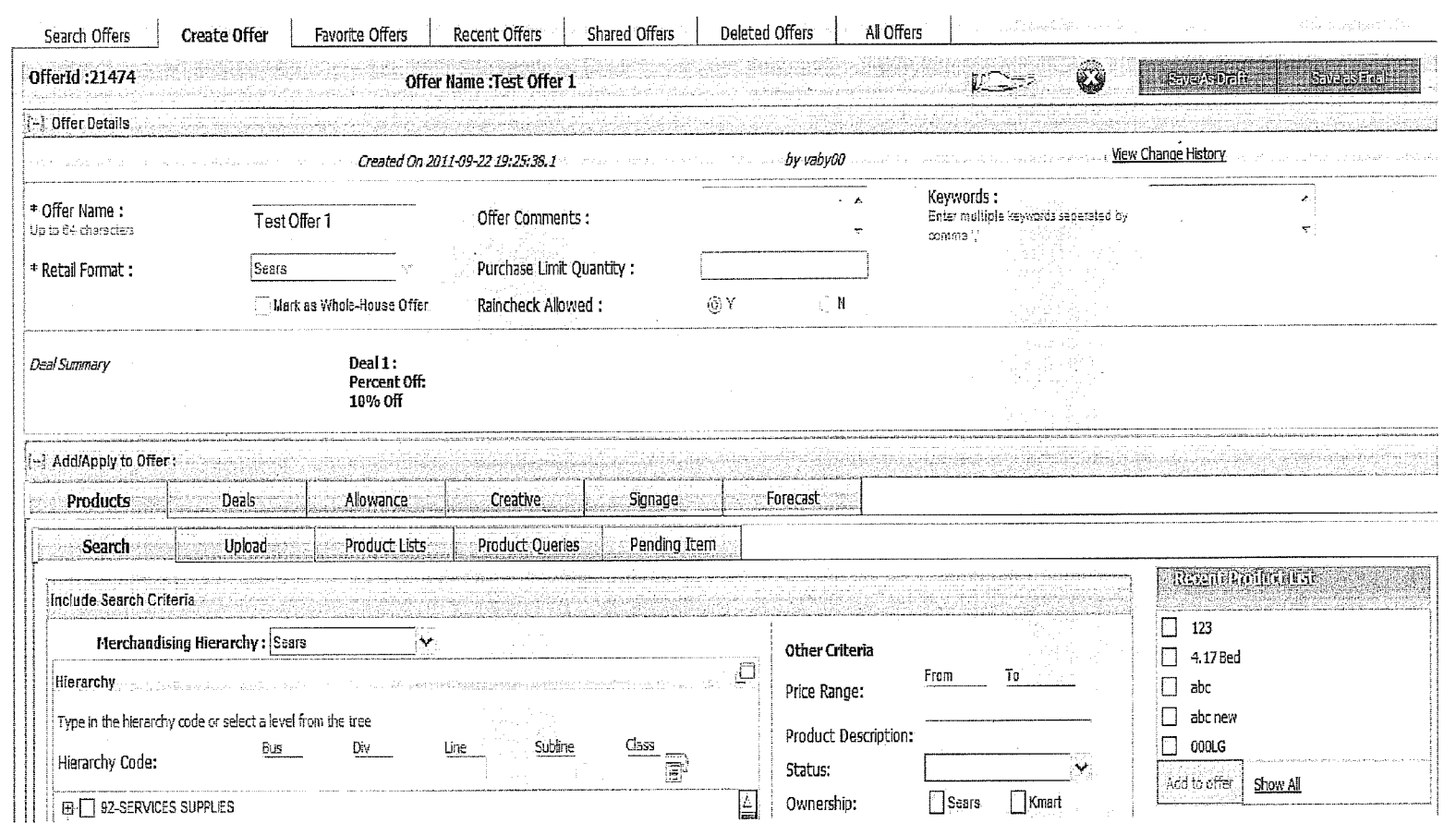

FIG. 11 is a screen shot of an offer management window displayed in an offer manager application, in accordance with a representative embodiment of the present invention. Referring to FIG. 11, the offer manager application provides an offer management window to facilitate product selection, deal type selection, allowance information entry, creative detail entry, signage information entry, and/or forecast information entry, for example, for creating an offer as illustrated and described in reference to blocks 131-136 of FIG. 9. The offer management window can include menus, buttons, prompts, and the like for assigning an offer name, specifying a retail format, providing keywords to identify the offer when searching for existing offers, providing comments regarding the offer being created, specifying a purchase limit quantity, specifying if rainchecks are allowed, and specifying whether a whole-house offer, for example. The offer management window can provide a summary of the deal type and search criteria for searching for a product to associate with the created offer. The search criteria may include menus, buttons, prompts, and the like for searching by hierarchy, price range, product description, status, and/or ownership, for example. In certain embodiments, the offer management window can include a list of selectable recent products. The offer management window can provide links, buttons, menus, and the like to access deals, allowance information, creative detail information, signage information, forecast information, pending items, product queries, product lists, and to facilitate upload of information to associate with an offer. The offer manager application may provide links, buttons, menus, and the like to provide access to offer search, favorite offers, recent offers, shared offers, deleted offers, and all offers, for example.

Referring again to FIG. 9, the method of FIG. 9 continues at blocks 137-139, where the processor 16 executing an offer manager application searches, selects, and/or edits an offer based on information received from user input device(s) 14. At block 137, a search for an existing offer is performed. For example, a search for an existing offer can be performed in the offer manager application executed by the processor 16 based on information received from user input device(s) 14. The existing offer being searched may be an offer created at blocks 131-136, for example. The offer search can be a basic search or an advanced search, for example. A basic search can include searching by an identification code associated with the offer, an offer name, offer keywords, and/or by user performing the most recent modifications, for example. An advanced search may include searching by retail format, hierarchy code, hierarchy tree structure, product code, product list name, product query name, offer name, offer identification code, offer deal type, offer keywords, offer status, user performing the most recent modifications to an offer, last offer modification date, user creating the offer, offer creation date, and/or offer instances, for example. In response to a search, the offer manager can provide a list, or any suitable search result display mechanism, of existing offers that match and/or are related to the information provided by the user input device(s) 14 to execute the search. The list can include various information regarding the listed offer(s) such as, for example, an indication of whether the offer was designated as a favorite offer, an offer name, an offer identification code, an offer deal type summary, an offer status, an indication of the user performing the most recent modifications to the offer, last offer modification date, and/or a date the offer was last used, among other things.

Next, at block 138, an existing offer is selected from the displayed search results. For example, an existing offer displayed at display 15 can be selected in the offer manager application executed by the processor 16 based on information received from user input device(s) 14. In various embodiments, the list can include a selection mechanism, such as a checkbox, for selecting one or more of the listed existing offers. Selected offers can be deleted, shared with other users, and/or exported for editing and/or association with a configured activity, for example. In certain embodiments, links, buttons, and the like can be provided to facilitate clearing user selections and/or clearing a searched list, for example.

At block 139, a selected offer can be edited and/or updated if necessary. For example, a selected offer may be edited in the offer manager application executed by the processor 16 based on information received from user input device(s) 14. In various embodiments, prior to associating a selected offer with a configured promotional activity at block 140, a selected offer can be viewed and product information, deal type, allowance information, creative details, signage information, and/or forecast information, among other things, may be edited if necessary.

Figure 12:
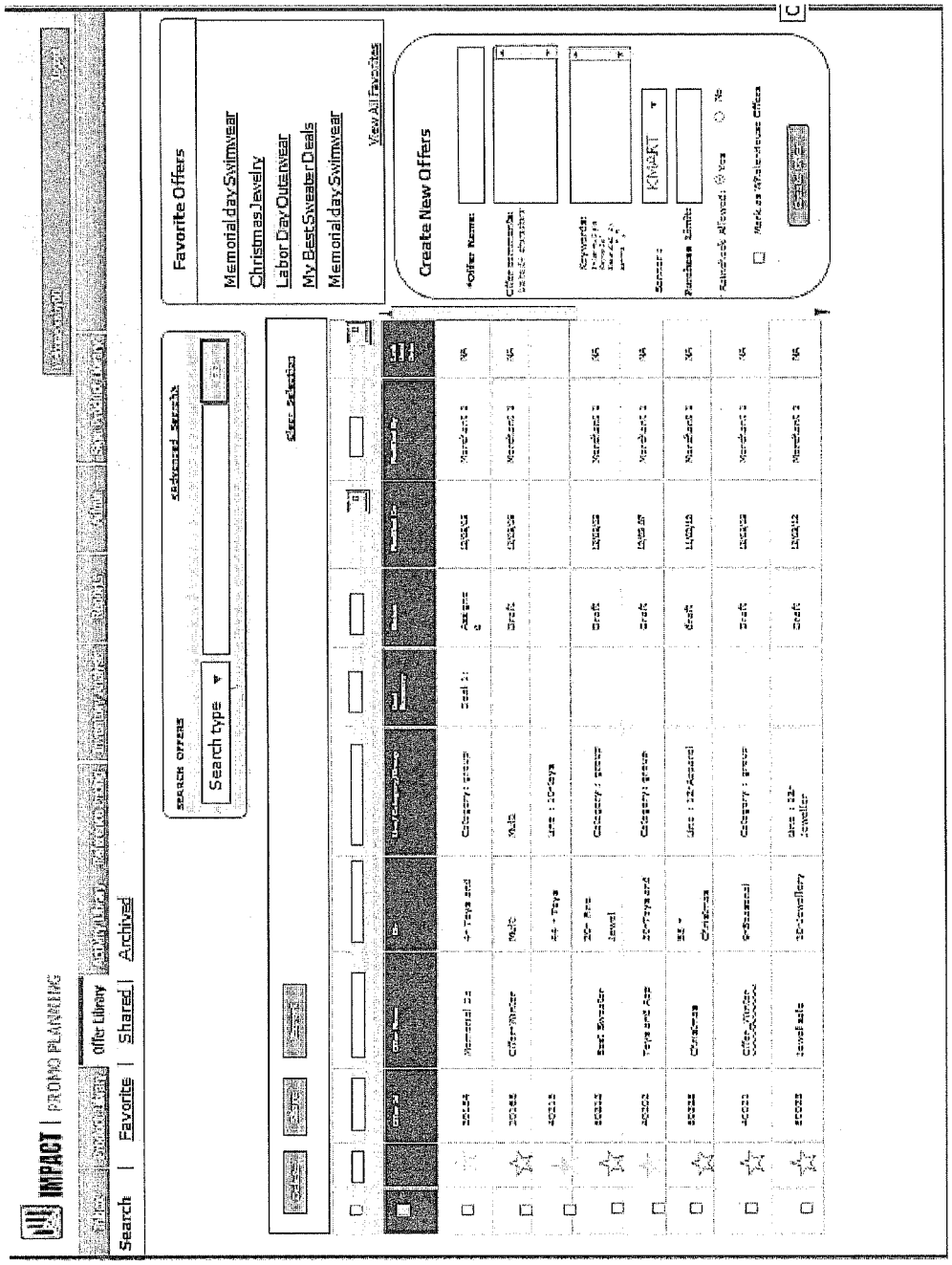
FIG. 12 is a screen shot of an offer search window displayed in an offer manager application, in accordance with a representative embodiment of the present invention.

FIG. 12 is a screen shot of an offer search window displayed in an offer manager application, in accordance with a representative embodiment of the present invention. Referring to FIG. 12, the offer manager application provides an offer search window based on an offer search selection received from user input device(s) 14. The offer search window can include menus, buttons, prompts, and the like for indicating a search type, providing search terms, and/or initiating a search, for example. The search type can include, for example, an identification code associated with the offer, an offer name, offer keywords, and/or by user performing the most recent modifications, among other things. The search terms can be provided based on information received from user input device(s) 14 at a text box, for example, of the offer search window. Initiating a search after indicating a search type and/or providing search terms may include receiving an input from user input device(s) selecting a "GO" button and/or indicating a depression of the "Enter" key on a keyboard, for example.

In response to an executed search, the offer search window can provide search results in a list or any suitable search result display mechanism. The list can include various information regarding the listed offer(s) such as, for example, an indication of whether the offer was designated as a favorite offer, an offer name, an offer identification code, an offer deal type summary, an offer status, an indication of the user performing the most recent modifications to the offer, last offer modification date, and/or a date the offer was last used. In various embodiments, the list can include a selection mechanism, such as a checkbox, for selecting one or more of the listed existing offers. Selected offers can be deleted, shared with other users, and/or exported for editing and/or association with a configured activity, for example. In certain embodiments, links, buttons, and the like can be provided to facilitate clearing user selections and/or clearing a searched list, for example.

In various embodiments, the offer search window can include a list of favorite offers and an option to begin creating a new offer, for example. The offer manager application may provide links, buttons, menus, and the like to provide access to offer search, favorite offers, recent offers, shared offers, and archived offers, for example. The offer manager application may provide links, buttons, menus, and the like to provide access to a message inbox, product library, activity library, reference pricing, inventory analysis, reports, administrative information, and a sign product library, for example. In various embodiments, the offer manager application can provide links, buttons, and the like to access an advanced offer search window.

Figure 13:
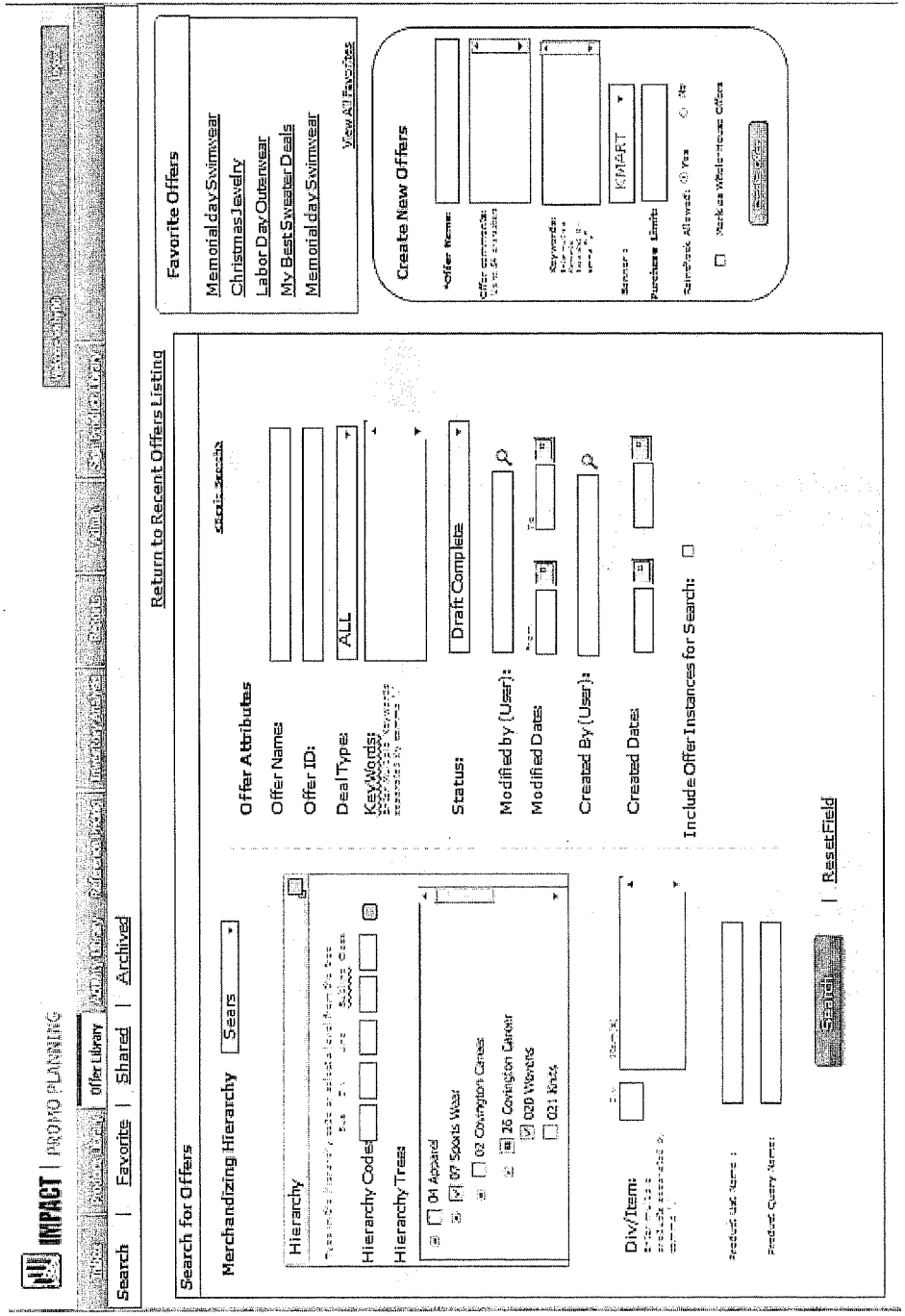
FIG. 13 is a screen shot of an advanced offer search window displayed in an offer manager application, in accordance with a representative embodiment of the present invention.

FIG. 13 is a screen shot of an advanced offer search window displayed in an offer manager application, in accordance with a representative embodiment of the present invention. Referring to FIG. 13, the offer manager application provides an advanced offer search window based on an advanced offer search selection received from user input device(s) 14. For example, user input device(s) 14 can select an advanced search link in the offer search window displayed in the offer manager application as illustrated in FIG. 12, for example.

The advanced offer search window can include menus, buttons, text boxes, and the like for providing search information, clearing search information, and/or initiating a search, for example. The search information shown in FIG. 13 may include, for example, selectable and/or specifiable merchandising hierarchies, hierarchy codes, hierarchy tree structures, product codes, product list names, product query names, offer names, offer identification codes, offer deal types, offer keywords, offer status, user performing the most recent modifications to an offer, last offer modification date, user creating the offer, offer creation date, and/or offer instances. In certain embodiments, search information can be reset and/or cleared in response to a selection from user input device(s) 14. For example, user input device(s) 14 can provide an input selecting a "Reset Field" button or link. Initiating a search after providing search information may include receiving an input from user input device(s) selecting a "Search" button and/or indicating a depression of the "Enter" key on a keyboard, for example.

In response to an executed search, results can be provided in a list or any suitable search result display mechanism as shown in FIG. 12, for example. In various embodiments, the advanced offer search window can include a list of favorite offers and an option to begin creating a new offer, for example. The offer manager application may provide links, buttons, menus, and the like to provide access to offer search, favorite offers, recent offers, shared offers, and archived offers, for example. The offer manager application may provide links, buttons, menus, and the like to provide access to a message inbox, product library, activity library, reference pricing, inventory analysis, reports, administrative information, and a sign product library, for example.

Referring again to FIG. 9, at block 140 the selected offer is associated with the configured promotional activity. For example, a selected offer can be associated with a page and/or block within a page of a configured promotional activity in the offer manager application executed by the processor 16 based on information received from user input device(s) 14. The selected offer can be the offer created at blocks 131-136 and/or the offer searched, selected and/or edited at blocks 137-139. The configured promotional activity may be a page and/or a block within a page of a configured promotional activity, such as the promotional activity configured at block 120 shown in FIG. 2 and/or with the configuration settings application 200 shown in FIG. 3, for example.

Although the methods 800, 130 are described with reference to the exemplary elements of the systems described above, it should be understood that other implementations are possible.

One or more of the steps of the methods 800, 130 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps, and/or perform the steps in a different order than the order listed, and/or combine certain of the steps listed above. For example, some steps may not be performed in certain embodiments of the present invention. As a further example, certain steps may be performed in a different temporal order, including simultaneously, than listed above.

Aspects of the present invention may be seen in a system 10 configured to create and manage a promotional activity. In a representative embodiment, the system 10 comprises a user input device 14 configured to provide a user input for at least one application, a display 15 configured to display information from the at least one application, and a processing unit 16 communicatively coupled to the user input device 14 and the display 15. The processing unit 16 is configured to execute one or more application to create the promotional activity, configure the promotional activity, and associate an offer with the configured promotional activity.

In various embodiments, the processing unit configured to execute the application(s) to create the promotional activity receives the user input. The user input specifies two or more of a communication channel, an activity start date, an activity end date, a distribution pattern, and a geographic location. In a representative embodiment, the communication channel is one of a circular, a direct mailing, and a catalog.

In various embodiments, the promotional activity comprises a plurality of pages. Each of the plurality of pages comprises at least one block. The application(s) executed by the processing unit to configure the promotional activity selects a page from the plurality of pages to configure, selects a block of the selected page to configure, and adds and/or edits the selected block to assign one or more allocations to the selected block. In a representative embodiment, the at least one allocation comprises at least one of: a business unit of a retail store, a product type, and a product In various embodiments, the application(s) executed by the processing unit to associate an offer with the configured promotional activity create the offer by at least selecting a product, selecting a deal type, and providing creative details.

In a representative embodiment, the deal type comprises a complex deal. The complex deal is one or more of an offer based on a number of units purchased; an offer based on a dollar amount spent; a buy X, get at least one of a dollar amount off and a percentage off of X offer; a buy X, get at least one of a dollar amount off and a percentage off Y offer; a buy X and Y, get at least one of a dollar amount off and a percentage off Z offer; a buy X, Y and Z, get at least one of a dollar amount off and a percentage off A offer; and, a buy X, Y, Z and A, get at least one of a dollar amount off and a percentage off B offer. In various embodiments, X, Y, Z, A and B are different products having a defined quantity.

In a representative embodiment, the creative detail comprises one or more of a logo, an image, and instructions for generating the promotional activity. In various embodiments, the application(s) executed by the processing unit to associate an offer with the configured promotional activity select the offer from two or more existing offers. In a representative embodiment, the promotional activity comprises two or more pages, each of the pages comprising one or more blocks. The application(s) executed by the processing unit to associate an offer with the configured promotional activity associate the offer with a selected block from a selected one of the pages.

Aspects of the present invention may be seen in a method 100 for creating and managing a promotional activity. The method 100 is performed by one or more processing units 16 executing one or more applications. The method 100 comprises creating the promotional activity 110, configuring the promotional activity 120, and associating an offer with the configured promotional activity 130.

In a representative embodiment, the creating the promotional activity comprises specifying two or more of a communication channel, an activity start date, an activity end date, a distribution pattern, and a geographic location. In various embodiments, the communication channel is one of a circular, a direct mailing, and a catalog. In a representative embodiment, the promotional activity comprises two or more pages. Each of the two or more pages comprises one or more blocks. The configuring the promotional activity 120 comprises selecting a page from the plurality of pages to configure 210, selecting a block of the selected page to configure 220, and assigning one or more allocations to the selected block 230. In various embodiments, the allocation(s) comprise one or more of a business unit of a retail store, a product type, and a product.

In a representative embodiment, associating an offer with the configured promotional activity 130 comprises creating the offer 131-136. Creating the offer comprises selecting a product 131, selecting a deal type 132, and providing creative details 134. In various embodiments, the deal type comprises a complex deal. The complex deal is one or more of an offer based a number of units purchased; an offer based on a dollar amount spent; a buy X, get at least one of a dollar amount off and a percentage off of X offer; a buy X, get at least one of a dollar amount off and a percentage off Y offer; a buy X and Y, get at least one of a dollar amount off and a percentage off Z offer; a buy X, Y and Z, get at least one of a dollar amount off and a percentage off A offer; and, a buy X, Y, Z and A, get at least one of a dollar amount off and a percentage off B offer. In a representative embodiments, X, Y, Z, A and B are different products having a defined quantity. In various embodiments, the creative details comprise one or more of a logo, an image, and instructions for generating the promotional activity.

In a representative embodiment, associating an offer with the configured promotional activity 130 comprises selecting the offer from a plurality of existing offers 137. In various embodiments, the promotional activity comprises two or more pages. Each of the two or more pages comprises one or more blocks. The associating an offer with the configured promotional activity 130 comprises associating the offer with a selected block from a selected one of the pages 140.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system configured to create and manage a promotional activity, the system comprising:
   a plurality of user computing devices communicatively linked via a network, wherein each of the plurality of user computing devices comprises:
      a user input device configured to provide a user input for at least one application;
      a display configured to display information from the at least one application; and
      a processing unit communicatively coupled to the user input device and the display,
   wherein the processing unit of a first one of the plurality of user computing devices is configured to execute an activity creation and management application to:
      create the promotional activity in response to user input received defining a plurality of promotional activity parameters, wherein the created promotional activity comprises a plurality of pages, each of the plurality of pages comprising promotional space, wherein each promotional space comprises at least one block;
      configure at least a portion of the created promotional activity to provide a configured portion of the promotional activity in response to user input to arrange at least one promotional space of the promotional activity and to assign at least one allocation to the at least one promotional space, wherein the at least one promotional space of the created promotional activity is configured by:
         selecting a page from the plurality of pages,
         selecting a block of the selected page to identify the at least one promotional space, and
         one or both of adding and editing the selected block to assign the at least one allocation to the at least one promotional space, wherein the at least one allocation is a business unit of a retail store; and
      release the configured portion of the promotional activity to allow an offer manager application executed by a second one of the plurality of user computing devices in communication via the network with the activity creation and management application to access the released promotional activity for offer association;
   wherein the processing unit of the second one of the plurality of user computing devices is configured to execute the offer manager application in communication via the network with the activity creation and management application, the offer manager application configured to:
      create an offer by at least:
         selecting a product, and
         selecting a deal type;
      access the released promotional activity from the activity creation and management application;
      associate the offer with the at least one promotional space of the released promotional activity;
      perform a conflict check by comparing the offer associated with the at least one promotional space of the released promotional activity to at least one related offer; and submit the offer associated with the at least one promotional space of the released promotional activity for approval.

2. The system according to claim 1, wherein the plurality of promotional activity parameters comprises a plurality of:
a communication channel,
an activity start date,
an activity end date,
a distribution pattern, and
a geographic location.

3. The system according to claim 2, wherein the communication channel is one of:
a circular,
a direct mailing, and
a catalog.

4. The system according to claim 1, wherein the at least one allocation is a hierarchy comprising the business unit of the retail store and at least one sub-allocation comprising one or both of:
a product type, and
a product.

5. The system according to claim 1, wherein the offer manager application executed by the processing unit to associate an offer with the at least one promotional space of the released promotional activity creates the offer by at least providing creative details in response to user input, the creative details comprising image inclusion instructions.

6. The system according to claim 1, wherein the deal type comprises a complex deal, and wherein the complex deal is one or more of:
an offer based a number of units purchased,
an offer based on a dollar amount spent,
a buy X, get at least one of a dollar amount off and a percentage off of X offer,
a buy X, get at least one of a dollar amount off and a percentage off Y offer,
a buy X and Y, get at least one of a dollar amount off and a percentage off Z offer,
a buy X, Y and Z, get at least one of a dollar amount off and a percentage off A offer, and
a buy X, Y, Z and A, get at least one of a dollar amount off and a percentage off B offer,
wherein X, Y, Z, A and B are different products having a defined quantity.

7. The system according to claim 5, wherein the creative details comprises one or more of:
a logo,
an image, and
instructions for generating the promotional activity.

8. The system according to claim 1, wherein the offer manager application executed by the processing unit to associate an offer with the at least one promotional space of the released promotional activity selects the offer from a plurality of existing offers.

9. A method for creating and managing a promotional activity, the method comprising:
performing by at least one processing unit of a first one of a plurality of user computing devices communicatively linked via a network, the at least one processing unit executing an activity creation and management application, at least:
creating the promotional activity in response to user input received defining a plurality of promotional activity parameters, wherein the created promotional activity comprises a plurality of pages, each of the plurality of pages comprising promotional space, wherein each promotional space comprises at least one block;
configuring at least a portion of the created promotional activity to provide a configured portion of the promotional activity in response to user input to arrange at least one promotional space of the promotional activity and to assign at least one allocation to the at least one promotional space, wherein the at least one promotional space of the created promotional activity is configured by:
selecting a page from the plurality of pages,
selecting a block of the selected page to identify the at least one promotional space, and
at least one of adding and editing the selected block to assign the at least one allocation to the at least one promotional space, wherein the at least one allocation is a business unit of a retail store; and
releasing the configured portion of the promotional activity to allow an offer manager application executed by a second one of the plurality of user computing devices in communication via the network with the activity creation and management application to access the released promotional activity for offer association; and
performing by at least one processing unit of the second one of the plurality of user computing devices executing the offer manager application in communication via the network with the activity creation and management application, at least:
creating an offer by at least:
selecting a product, and
selecting a deal type;
accessing the released promotional activity from the activity creation and management application;
associating the offer with the at least one promotional space of the released promotional activity;
performing a conflict check by comparing the offer associated with the at least one promotional space of the released promotional activity to at least one related offer; and
submitting the offer associated with the at least one promotional space of the released promotional activity for approval.

10. The method according to claim 9, wherein the plurality of promotional activity parameters comprises a plurality of:
a communication channel,
an activity start date,
an activity end date,
a distribution pattern, and
a geographic location.

11. The method according to claim 10, wherein the communication channel is one of:
a circular,
a direct mailing, and
a catalog.

12. The method according to claim 9, wherein the at least one allocation is a hierarchy comprising the business unit of the retail store and at least one sub-allocation comprising one or both of:
a product type, and
a product.

13. The method according to claim 9, wherein creating the offer comprises providing creative details in response to user input, the creative details comprising image inclusion instructions.

14. The method according to claim 9, wherein the deal type comprises a complex deal, and wherein the complex deal is one or more of:
- an offer based a number of units purchased,
- an offer based on a dollar amount spent,
- a buy X, get at least one of a dollar amount off and a percentage off of X offer,
- a buy X, get at least one of a dollar amount off and a percentage off Y offer,
- a buy X and Y, get at least one of a dollar amount off and a percentage off Z offer,
- a buy X, Y and Z, get at least one of a dollar amount off and a percentage off A offer, and
- a buy X, Y, Z and A, get at least one of a dollar amount off and a percentage off B offer, wherein X, Y, Z, A and B are different products having a defined quantity.

15. The method according to claim 13, wherein the creative details comprises one or more of:
- a logo,
- an image, and
- instructions for generating the promotional activity.

16. The method according to claim 9, wherein associating an offer with the at least one promotional space of the released promotional activity comprises selecting the offer from a plurality of existing offers.

17. At least one non-transitory computer-readable medium encoded with at least one set of instructions for execution on a plurality of user computing devices communicatively coupled via a network, the at least one set of instructions comprising:
- a promotional activity creation routine of an activity creation and management application configured to create a promotional activity in response to user input received defining a plurality of promotional activity parameters, wherein the created promotional activity comprises a plurality of pages, each of the plurality of pages comprising promotional space, wherein each promotional space comprises at least one block;
- a configuration routine of the activity creation and management application configured to configure at least a portion of the created promotional activity to provide a configured portion of the promotional activity in response to user input to arrange at least one promotional space of the promotional activity and to assign at least one allocation to the at least one promotional space, wherein the at least one promotional space of the created promotional activity is configured by:
  - selecting a page from the plurality of pages,
  - selecting a block of the selected page to identify the at least one promotional space, and
  - one or both of adding and editing the selected block to assign the at least one allocation to the at least one promotional space, wherein the at least one allocation is a business unit of a retail store;
- a promotional activity release routine of the activity creation and management application executed at a first one of the plurality of user computing devices, the activity creation and management application configured to release the configured portion of the promotional activity to allow an offer manager application executed at a second one of the plurality of user computing devices and in communication via the network with the activity creation and management application executed at the first one of the plurality of user computing devices to access the released promotional activity for offer association;
- an offer creation routine of the offer manager application configured to create an offer by at least:
  - selecting a product, and
  - selecting a deal type;
- an access routine of the offer manager application in communication with the activity creation and management application configured to access the released promotional activity from the activity creation and management application;
- an association routine of the offer manager application configured to associate the offer with the at least one promotional space of the released promotional activity;
- a conflict check routine of the offer manager application configured to perform a conflict check by comparing the offer associated with the at least one promotional space of the released promotional activity to at least one related offer; and
- a submission routine of the offer manager application configured to submit the offer associated with the at least one promotional space of the released promotional activity for approval.

* * * * *